United States Patent [19]

Kohama et al.

[11] Patent Number: 5,407,610
[45] Date of Patent: Apr. 18, 1995

[54] METHOD FOR MOLDING FIBER-REINFORCED RESIN

[75] Inventors: Katsumi Kohama, Saitama; Hiromi Tanaka, Tokyo; Ryoichi Yugami; Tomohisa Abe, both of Saitama; Daisuke Atobe, Osaka; Hidemitsu Takizawa, Osaka; Kenichi Ueda, Osaka; Yuji Inagaki, Osaka, all of Japan

[73] Assignees: Honda Giken Kogyo Kabushiki Kaisha, Tokyo; Nippon Shokubai Kagaku Kogyo Co., Ltd., Osaka, both of Japan

[21] Appl. No.: 94,918

[22] Filed: Jul. 22, 1993

Related U.S. Application Data

[60] Continuation of Ser. No. 908,927, Jul. 2, 1992, abandoned, which is a division of Ser. No. 650,842, Feb. 5, 1991, abandoned.

[30] Foreign Application Priority Data

| Feb. 6, 1990 | [JP] | Japan | 2-026902 |
| Feb. 6, 1990 | [JP] | Japan | 2-026903 |
| Feb. 6, 1990 | [JP] | Japan | 2-026904 |
| Feb. 6, 1990 | [JP] | Japan | 2-026905 |
| Sep. 25, 1990 | [JP] | Japan | 2-254732 |

[51] Int. Cl.$^6$ .................................. B29C 51/12
[52] U.S. Cl. ........................... 264/22; 264/25; 264/236; 264/257; 264/316; 264/510; 264/516
[58] Field of Search ............ 264/510, 511, 512, 516, 264/316, 257, 258, 22, 25, 522, 552, 236; 425/389, 174, 174.4

[56] References Cited

U.S. PATENT DOCUMENTS

| 3,140,325 | 7/1964 | Gräff | 264/510 |
| 3,334,383 | 8/1967 | Irvine | 425/389 |
| 3,546,740 | 12/1970 | Johnson | 425/389 |
| 3,962,392 | 6/1976 | Conner, Jr. | 264/316 |
| 4,131,664 | 12/1978 | Flowers et al. | 264/510 |
| 4,299,938 | 11/1981 | Green et al. | 526/192 |
| 4,478,771 | 10/1984 | Schreiber | 264/22 |
| 4,518,676 | 5/1985 | Irving | 430/280 |
| 4,609,519 | 9/1986 | Pichard et al. | 264/510 |
| 4,863,667 | 9/1989 | Martelli | 264/510 |
| 4,876,055 | 10/1989 | Cattanach | 264/316 |
| 5,002,476 | 3/1991 | Kerr | 264/22 |

FOREIGN PATENT DOCUMENTS

| 36391 | 9/1981 | European Pat. Off. | 264/22 |
| 165118 | 12/1985 | European Pat. Off. | 264/22 |
| 195561 | 9/1986 | European Pat. Off. | 264/511 |
| 2255202 | 5/1974 | Germany | 264/22 |
| 59-201822 | 11/1984 | Japan . | |
| 61-243831 | 10/1986 | Japan | 264/22 |
| 63-081021 | 4/1988 | Japan | 264/511 |
| 895339 | 5/1962 | United Kingdom . | |
| 920798 | 3/1963 | United Kingdom . | |
| 940407 | 10/1963 | United Kingdom . | |
| 1095524 | 12/1967 | United Kingdom . | |
| 1200499 | 7/1970 | United Kingdom . | |
| 1547280 | 6/1979 | United Kingdom . | |
| 2155845 | 10/1985 | United Kingdom . | |
| 8607005 | 12/1986 | WIPO | 264/511 |

Primary Examiner—Catherine Timm
Attorney, Agent, or Firm—Armstrong, Westerman, Hattori, McLeland & Naughton

[57] ABSTRACT

In a method for molding a sheet which includes thermosetting resin materials reinforced with glass fiber or carbon fiber, the sheet includes a covering film always existing in a side which is not in contact with a mold face and, when the sheet and covering film are shaped along a mold face and the sheet is thermally cured, apparatus for dealing with an accidental breakage of the covering film is arranged on the side of the sheet which is covered by said covering film.

8 Claims, 13 Drawing Sheets

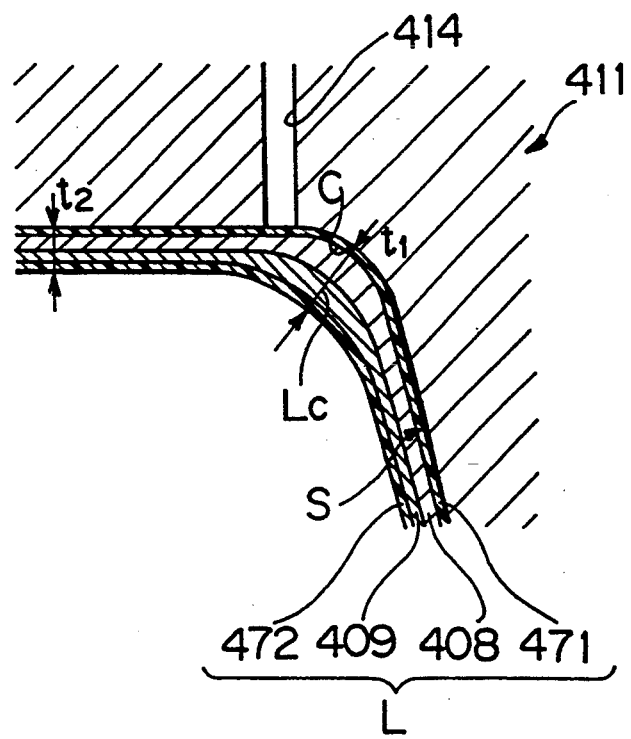
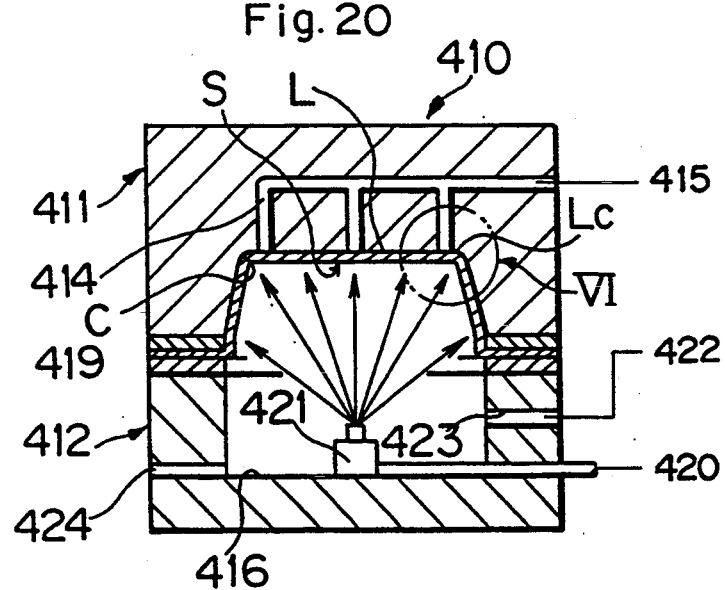

METHOD FOR MOLDING FIBER-REINFORCED RESIN

This application is a continuation of application Ser. No. 07/908,927, filed Jul. 2, 1992, no abandoned, which is a division of application Ser. No. 07/650,842, filed Feb. 5, 1991, now abandoned.

BACKGROUND OF THE INVENTION

The present invention relates to a method for molding fiber-reinforced resins. More particularly, the present invention relates to a method for producing a molding consisting essentially of a thermosetting resin reinforced with glass or carbon fiber.

Many methods for producing a fiber-reinforced resin molding are known, including hand lay up method, spray molding method, metallic-mold molding method, and vacuum molding method.

FIG. 23 shows an outline of the vacuum molding method, wherein a reinforcing material such as glass fiber or carbon fiber is added to a liquid thermosetting resin such as an unsaturated polyester resin to prepare fiber-reinforced resin sheet beforehand for molding sheet S. The molding sheet thus-prepared is arranged on a molding mold m (hereinafter, the "molding mold" is simply referred to as the "mold") of a female type (or a male type) and shaped so as to be along a mold face, by absorbing the sheet under vacuum from a vacuum-absorption opening V which is arranged on a mold face of the mold m. The sheet is then thermally cured and taken out from the mold m to obtain a molding having a desired shape.

This method includes adhering a covering film C consisting essentially of a thermoplastic resin having a soft and stretchable character on a surface of the molding sheet S in a side which is not in contact with a mold face of the mold m. This covering film is used to prevent invasion of air-bubbles into a resin material of the molding sheet S. More particularly, the resin material constituting the molding sheet S is a liquid. Air bubbles can come into the resin material or unevenness is formed on its surface if the surface of the resin material is exposed, because of a pressure difference between both surfaces of the molding sheet S results from a vacuum absorption. However, air entry is prevented if a covering film C is stuck on an exposed surface of the resin material of the molding sheet S. The covering film C is also effective for preventing cohesion of sheets, when the molding sheets S are laminated one upon another, and for making handling of the molding sheet S easy. Also, there is a case of setting the covering film C on both surfaces of the molding sheet S.

Such a vacuum molding method as described above has been expected for broad and various kinds of application, wherein a structure of the mold m is simple, a precise mold is not so much required, and a molding of relatively high precision can be produced with high efficiency.

There is also a pressure molding method in which the molding sheet S is shaped by pressing it on a mold face with a pressure applied to a surface on a side which is not in contact with a mold face of the mold m. The vacuum molding method and pressure application methods can also be combined in a method wherein the molding sheet S is shaped by using both vacuum absorption and pressure application.

As a production method of this kind there has hitherto been known a method disclosed in Japanese Official Patent Provisional Publication, showa 59-201822.

However, in such a hitherto used method, there has been found a problem that the covering film C which covers a surface of the molding sheet S locally melts in a thermal curing process. If the covering film C has a hole due to the local melting, the liquid resin material constituting the molding sheet S is exposed on the surface. In particular, the covering film C, which has been stretched and deformed by tightly adhering to a surface of the molding sheet S, is peeled off from the resin material due to a tendency to return to its original flat form. Therefore the molding sheet S suffers invasion of air-bubbles, and becomes dirty due to formation of uneven irregularities on the surface. Because of these problems, a good molding is not obtained.

Since a material having heat-resistance over the temperature being employed in a thermal curing process is used as the covering film C, this covering film does not melt by only external heating. Instead, a thermosetting resin material constituting the molding sheet S generates heat by itself and a temperature rise accompanied with this curing heat-generation causes melting of the covering film C. The temperature rise accompanied with the curing heat-generation of a resin material is not uniform over the whole molding sheet S. Thus, in a part where the curing first proceeds and conversion from a liquid into a solid takes place, generated heat is locally contained causing local high temperature which exceeds a heat-resistant temperature of said covering film C due to difficulty in heat conviction.

If the covering film C is holed, by even local melting, air enters from this hole into a gap between the covering film C and the liquid resin material. In this case, the covering film C tends to return to an original flat state due to an elastic recovering force of the material itself and may peel off from the resin material. Since the covering film C only adheres to the liquid resin material, if the air enters from a hole of the covering film C, the film C may easily be peeled off.

Besides, if there is a locally damaged or weakened part, or hole due to a defect on the covering film C which is applied to the molding sheet S, the damaged or weakened part may be broken during a shaping process, the damaged or weakened portion may be torn making a hole, or this hole may spread, and thus, there occurs a problem similar to that accompanied with hole generation due to the forementioned melting.

Furthermore, there is another problem that, upon shaping the molding sheet S along the mold face, a corner portion of the covering film C at a concave valley shape of the mold face is separated by its restoring force from the valley-shaped corner part. A resin solution constituting the molding sheet S flows from circumference of the valley into the valley-shaped corner part. As a result an amount of the resin solution increases at the valley-shaped corner part, thereby making the thickness of the molding sheet S massive in comparison to other parts of the sheet.

If the thickness of the resin solution differs depending upon a part of the molding sheet S, at said valley-shaped corner part where the thickness of the resin solution is massive, an amount of heat generated during thermal curing increases causing a high local temperature, so that melting of the covering film C as described above takes place easily. Also, because of a thickness difference of the molding sheet S, the thickness of a molding becomes non-uniform and its strength and other properties are reduced.

SUMMARY OF THE INVENTION

Thus, an object of the present invention is to provide a method for producing a molding which solves a peeling problem of a covering film arising from local melting or a hole due to a defect in a covering film, prevents entry of air-bubbles, and which provides a molding having a beautiful surface and good finish.

In addition, another object is to provide a means capable of producing a molding of uniform thickness.

A method for molding fiber-reinforced resins achieving the forementioned objects and relating to the present invention comprises that, in a method for molding fiber-reinforced resins comprising arranging a molding sheet of fiber-reinforced resins on a mold, at least one side of which is covered with a soft elastic film, so that the covered film always exists in a side of the sheet which is not in contact with the mold face, a process to shape said molding sheet together the covering film along the mold face, and a process to carry out thermal curing of the molding sheet, a means for dealing with an accidental breakage of said covering film is arranged on the side of said molding sheet which is not in contact with the mold face.

The fiber-reinforced resins used in the molding sheet are similar to those used in a conventional sheet molding process. Various kinds of thermosetting resins may be optionally employed, including an unsaturated polyester resin, an epoxy resin, a polyurethane resin, and an epoxy (meth)acrylate resin. Conventional reinforcing fibers for the resin material can be optionally used including a roving, mat, swirl mat, and non-woven fabric. The reinforcing fibers may consist essentially of glass, carbon, metal, Kevlar (a commercial name for an aramid resin product of Du pont de Nemours & Co.), and Tetoron (a commercial name for a polyester resin product of Toray Co. and Teijin Co.) and so on. These reinforcing materials are coated or immersed with said resin material, shaped to a sheet form, and then used.

The molding sheet may consist of a single fiber-reinforced resin layer, a sheet consisting of a plurality of laminated fiber-reinforced resin layers, a sheet consisting of a combination of several kinds of laminated fiber-reinforced resin layers composed of different resin materials or reinforced materials, a sheet consisting of a combination of a fiber-reinforced resin layer and a non-reinforced resin material layer. In a production process, in case of necessity, viscosity-enriching of a resin is carried out by a common means.

Various kinds of thermoplastic resin films similar to those used in a usual molding method may be used as a covering film. The film should have adequate flexibility and elongation so as to be able to change shape with the molding sheet, and it should be impervious to the resin material used in the molding sheet. Suitable resins include nylon, vinylon, polyvinyl alcohol, polypropylene, and polyethylene. The thickness of the covering film may be similar to that used in a usual molding method, but preferably its thickness is 5~500 $\mu$m and more preferably 10~100 $\mu$m. The covering film is pasted on one or both faces of the molding sheet. Since the molding sheet consists essentially of a liquid resin material, it can be pasted by only adhering a covering film on a surface. In a case where the molding sheet consists of several reinforced resin layers or a resin single layer, the molding sheet may be produced by pasting the covering film with a part of the fiber-reinforced resin layer or the resin single layer followed by being laminated into one body with a residual layer.

A mold similar to that used for a conventional vacuum forming or a pressure forming process and which has an optional shape structure may be employed in the claimed process. The mold may be either a female type or a male type. A metal mold consisting of steel and aluminum and also, a resin mold may be employed.

Molding of fiber-reinforced resins was performed using the molding sheet, covering film, and mold described above. A fundamental molding process is carried out in a similar way to a usual molding method. The molding sheet may be beforehand subjected to viscosity-enriching by adding a viscosity-enriching agent to a resin material, or adopting a common viscosity-enriching means such as light irradiation and heating, etc.

Under a condition that a covering film is arranged in a side which is not in contact with a mold face, a molding sheet fiber-reinforced resins is shaped and cured with heating along the mold face.

As a method for shaping a molding sheet along a mold face there can freely be applied a vacuum absorption method by which the sheet is shaped by performing vacuum-absorption, a pressure-shaping method by which the molding sheet is shaped by applying fluid pressure as air etc. to a side opposite to the mold face, or a method in which vacuum-absorption and pressure-application are performed simultaneously.

As a means for thermal curing of a molding sheet, besides a method in which a mold is set in a freely warming condition and a molding sheet is warmed by heat transfer from the mold face, there may be jointly applied various kinds of common curing methods such as a method in which a whole atmosphere is warmed, and a method in which a UV curing agent is contained in a resin material of a molding sheet followed by curing by exposing the resin material to ultraviolet rays.

Next, in the present invention a means for dealing with an accidental breakage of the covering film is arranged on the covering film on the side which is not in contact with the mold face.

The means for dealing with an accidental breakage includes methods using a rubber sheet, a method wherein the curing of a surface of a molding sheet is promoted by irradiating ultraviolet rays or electron rays and direct heating and so on, a method using a protective layer, and a cooling method. Hereinafter, each of the methods is explained.

I. The Rubber Sheet Method

A rubber sheet has been used where elastic deformation is required in various kinds of molding devices. Silicone rubber is a rubber material suitable for the present invention.

In the present invention thermal curing of a fiber-reinforced resin molding sheet is carried out under a condition wherein a rubber sheet is set along a surface of a covering film on a side which is not in contact with the face of the mold.

The following methods may be used to set the rubber sheet on a surface of a shaped covering film.

At first, a rubber sheet, covering film, and molding sheet were adhered on their whole faces to be firmly set at their circumference and then, if the molding sheet is shaped by absorbing it under vacuum from the face of a mold, the rubber sheet adhered with the molding sheet and covering film is shaped with elastic deformation and set along a surface of the covering film. Also, in this method the covering film and molding sheet, together with the rubber sheet, are shaped by pressing them on the face of a mold by applying a fluid pressure as such air, water, and oil etc. to a rear side of the rubber sheet.

If a rubber sheet is placed in a gap which is made between the rubber sheet and the covering film and then, a fluid pressure is applied to a rear side of the rubber sheet, a central part of the rubber sheet and its circumference part subsequently come in contact with the covering film with expansion of the rubber sheet by the fluid pressure and, as a result, air between the rubber sheet and the covering film is led from the central part to the circumference.

Also, if the gap inside is brought to a reduced pressure under a condition wherein the gap between the rubber sheet and the covering film is intercepted from the circumference, the air in the gap is compulsorily evacuated and the rubber sheet which expands with a pressure difference is firmly adhered to the covering film. This pressure reduction in the gap and the pressure addition of the fluid pressure to said rear side of the rubber sheet may be jointly used.

II. The Surface Cure Promotion Method

In this method a different means for promoting curing, in addition to thermal curing of the entire molding sheet, is applied to the surface layer of the molding sheet on the side which is not in contact with the mold face. Any known curing method may be used as long as it can cure a resin material of the molding sheet, including a UV irradiation method, a method by irradiating electron rays, a direct heating method and so on.

When the UV irradiation method is employed, a UV curing agent should be added to the resin material of the molding sheet. In the methods by irradiating electron rays and by direct heating a resin material composed of common thermosetting resins can be employed.

Next, practical means for promoting curing are explained in detail.

A. The UV Irradiation Method

To a resin material of a fiber-reinforced resin molding sheet is added a UV curing agent together with a thermal curing agent. The thermal curing agent which is used for conventional molding of sheets in accordance with the resin material may be employed. For example, organic peroxides and diazo compounds may be employed with unsaturated polyester resins, etc, and an auxiliary agent is jointly used with the thermal curing agent.

The UV curing agent which is used may be similar to that used for molding common resins. Practically, although it differs with the kinds of resin materials, the following compounds are, for example, cited as a UV curing agent for an epoxy resin:

Aryl diazonium salts:
  Ar N$^+$≡N X$^-$ (Ar is an aryl group or a substituted aryl group; X$^-$ is $BF_4^-$, $AsF_6^-$, $PF_6^-$, or $SbCl_6^-$ etc.)

Diaryliodium salts:
  $Ar_2I^+X^-$ (Ar is an aryl group or a substituted aryl group; X$^-$ is $BF_4^-$, $AsF_6^-$, $PF_6^-$, or $SbCl_6^-$ etc.)

Triarylsulfonium salts:
  $Ar_3S^+X^-$ (Ar is an aryl group or a substituted aryl group; X$^-$ is $BF_4^-$, $AsF_6^-$, $PF_6^-$, or $SbCl_6^-$ etc.)

Although the UV curing agent may be added to a whole body of a resin material constituting the molding sheet, it may be added to only the surface layer opposite to the mold face when the molding sheet is shaped along the mold face. As described above, in a case where the molding sheet is formed by laminating plural resin layers, the UV curing agent may be added to only the resin layer which becomes the surface layer. On adding the UV curing agent to the resin material in the entire molding sheet, the entire molding sheet can be heated and cured by jointly using the thermal curing due to heat-transfer from the mold face with UV irradiation. When the UV curing agent is added to only the surface layer in one side of the molding sheet, the layer containing the UV curing agent is arranged on the side opposite the mold face.

The molding sheet is irradiated with ultraviolet rays to promote curing of the surface layer prior to thermal curing of the molding sheet. The time for irradiating ultraviolet rays is set so that, during a shaping stage of the molding sheet, the surface layer is not cured so much that shaping becomes impossible. It is also set so that, before melting the covering film during thermal curing of the molding sheet, the surface layer of the molding sheet is at least in a half degree cured. Since there is a time difference between UV irradiation and the proceeding of curing of the surface layer of the molding sheet, if the forementioned conditions are fulfilled, the start and completion of the UV irradiation can be appropriately adjusted in a period from beforeshaping of the molding sheet until its complete thermal cure. For example, it is possible to perform UV irradiation at the same time as the shaping-processing or after finishing of the shaping-processing. Furthermore, if curing of the surface layer does not proceed so much that the shaping is impossible at the time of shaping, it is possible to initiate UV irradiation before the shaping process.

Besides, it is preferred that curing of the surface layer by UV irradiation is stopped at a stage before complete curing. Even though the surface layer is not completely cured, it is completely cured, similarly to other parts, by thermal curing of the entire molding sheet.

The thickness of the surface layer being UV cured may be such that, even if local melting by heat-generation occurs during curing, air-bubbles do not enter to a resin interior or the resin material does not peel off by attaching to the covering film, and thus a slight order of thickness is enough.

The surface layer may be cured by irradiating ultraviolet rays on the entire face of the molding sheet or local curing may be performed by irradiating ultraviolet rays on only a part where melting of the covering film may occur. The means for UV irradiation may be a conventional ultraviolet lamp etc.

B. Direct Surface Heating Method

In this method there is arranged above the mold a direct surface-heating means to promote thermal curing of the surface layer of the shaped molding sheet. As the direct heating means there can be adopted various kinds of heating means such as a device for blowing hot air, a device for irradiating infrared rays, and a device for irradiating far-infrared rays and so on, as long as the function described above is fulfilled.

In this method, in a stage before the molding sheet is thermally cured, cure of the surface layer of the molding sheet is promoted by the direct heating means.

The time of promoting curing by direct heating can be set under the same conditions as those used to cure the surface layer by UV irradiation.

The surface layer which is cured by direct heating may be an entire face of the molding sheet, or the surface layer may be locally cured by carrying out a surface heating on only a part where melting of the covering film may occur. In this case, it is effective to adopt a means capable of local heating like hot air as a direct heating means.

III. The Protective Layer Method

A protective layer material should be able to protect the covering film during curing by enduring a high temperature and be capable of forming a layer on a surface of the covering film. A suitable material is, for example, a thermosetting resin, which may be the same resin material employed in the molding sheet. Typical examples of the thermosetting resin include an unsaturated polyester resin, a urethane resin, and a thermosetting acrylic resin. The curable material used to form the protective layer may be cured by heating, cured at room temperature by adding a suitable curing agent, cured by UV irradiation, and cured by a redox polymerization system. A material having a thixotropic character is preferred. Also, a high speed curing agent is preferred. A relatively thin protective layer is sufficient as long as it has a thickness capable of protecting the covering film.

Yet another method for forming a protective layer on a surface of the covering film, besides formation by coating a liquid curing material by brush-coating, spraying, sprinkling, etc., is by coating a liquid curing material on another supporting film which is then attached by pressing on the covering film. In this case, if the protective layer formed with coating on the supporting film has beforehand been enriched in viscosity, the handling is easy and a character jointing to the covering film is enhanced.

The protective layer may be formed on the covering film before the covering film is stuck on the molding sheet before the molding sheet and the covering film are set on the mold. If the protective layer is directly formed on the covering film by coating or by pressure attachment, the protective layer may be formed after shaping of the molding sheet and covering film. The protective layer may be formed on a whole face of the covering film or on only a part where melting of the covering film may occur.

In the case where a protective layer is beforehand formed on a surface of the covering film, the protective layer is shaped at the same time when the molding sheet and covering film are shaped.

In the present invention, a protective layer is formed on a surface of the covering film and cured at a stage before the molding sheet is cured by heating. A preferable time for curing the protective film is after the shaping. This is because, if the protective layer is cured before shaping of the molding sheet, shaping of the molding sheet is difficult to carry out. However, curing of the protective layer may be initiated before or during shaping of the molding sheet and may be completed after shaping of the molding sheet. Practically, for example, a protective layer is formed by coating a liquid curing material, to which is added a curing agent, on a surface of the covering film under a flat condition before shaping, and a shaping process of the molding sheet and covering film may be carried out prior to cure of the protective layer. Also, a protective film containing a UV curing agent is formed on the covering film, the UV irradiation is carried out before or during shaping of the molding sheet and covering film, and then the shaping of the molding sheet and covering film is arranged so as to finish before proceeding to the UV cure of an interior of the protective layer. Next, in a stage wherein thermal curing of the molding sheet proceeds and melting of the covering film occurs with a temperature-rise due to heat-generation accompanied with the curing, the protective layer is arranged so as to be sufficiently cured. That is, when the melting of the covering film takes place, it is enough that the protective layer is cured to a degree capable of preventing peeling off and floating up of the covering film, and thus complete curing of the protective layer is not always necessary. The time for curing the protective layer as described above can be adjusted by selecting a curable material constituting the protective layer and a curing agent as well as a curing method and its executing time.

Cure of the protective layer may be carried out for an entire surface of the covering film or only a part of the surface of the covering film where melting may occur. This is effective where a means capable of partially curing the protective layer is adopted, for example, a case where the protective layer is cured by UV irradiation.

IV. The Cooling Method

In this method, the surface layer of the molding sheet is cooled together with the covering film before the molding sheet is thermally cured. However, cooling is performed only to the extent capable of preventing melting and a breakdown of the covering film due to a local high temperature on the surface layer of the molding sheet. It is not necessary to strongly cool the surface layer, so that the thermal curing is disturbed.

The surface layer may be cooled by directing a cool gas such as room temperature air on the surface of the covering film by ejecting it from nozzle or by spraying a cool liquid such as water or a solvent on the surface of the covering film. That is, it is enough if the temperature of the covering film and surface layer of the molding sheet is reduced by attaching or bringing a cooling medium in contact with the surface of the covering film. As the cooling medium may be used jointly plural kinds of gases and liquids.

The preferred cooling medium contains water when the covering film is composed of a hydrophilic material. A material containing a solvent such as glycol is preferred where the covering film is composed of a lyophilic material. If the kind of cooling medium is selected according to the character of the covering film, the cooling medium will suppress a recovering force of the covering film.

The time when cooling of the covering film and surface layer of the molding sheet is initiated may be before shaping of the covering film and molding sheet, during the shaping process, after shaping but before thermal curing, or at a stage which is during the thermal curing and before proceeding in some degree of thermal curing of the molding sheet. To depress the recovering force of the covering film, the cooling medium should be applied to the covering film at an early stage, before shaping or during shaping.

The entire covering film and molding sheet may be cooled. Alternatively, only a part where a local surface temperature of the molding sheet becomes too high or only a part where the thickness of the molding sheet is apt to increase with recovering of the covering film may be selectively cooled. The corner part of a valley shape where the mold face is curved or crooked is one area whose local temperature can easily become too high. Also, recovery of the cover film can easily occur in this valley-shaped corner part. Therefore, it is preferred to cool this valley-shaped corner part.

In so-called sheet molding methods such as vacuum-molding and pressure-molding, the above-mentioned method for molding a fiber-reinforced resin relating to the present invention is able to prevent occurrence of uneven irregularities and napped conditions as well as air-bubble invasion by arranging a means for treating a breakdown of a covering film in a side, which is not in contact with a mold, of the covering film which is stuck to a molding sheet. As a result, it is possible to produce a molding which has a flat and pretty surface and a superior finish and is superior in mechanical properties and other kinds of qualities and capacities.

The operations and effects in each of the above-mentioned methods are explained below:

I. The Rubber Sheet Method

If a rubber sheet is arranged along a surface of a covering film on a side which is not in contact with the face of a mold, air bubbles cannot come into a resin material and an uneven irregularity cannot be formed on a surface even if the covering film locally melts due to heat generated during curing of a resin material constituting a molding sheet or if there is a defect or a hole etc. in the covering film. That is, since the surface of the covering film is covered with a rubber sheet and is not in contact with outside air, the covering film and a resin material of the molding sheet are not peeled off by air entering through a hole of the covering film and, the covering film (which is stretched together with the molding sheet) does not contract and return to its original state. Therefore, entry of air bubbles into a resin material does not take place and the surface is maintained in a flat and smooth condition. Because the rubber sheet has far more heat-resistance than a covering film, melting of the covering film does not need to be addressed even if there is a temperature rise due to heat generated by curing of a resin material.

Besides, if a surface of the molding sheet is placed in direct contact with the rubber sheet without a covering film, the rubber sheet may be invaded by a resin material or joined to a molding which is cured by heating, so that the rubber sheet becomes difficult to peel off from the molding. Also, compared to the covering film, the rubber sheet is thicker and heavier and of a higher price. It is not practical to handle and store a molding sheet stuck with a rubber sheet instead of the covering film. Therefore, like the present invention, a rubber sheet must be arranged on a surface of the covering film which is stuck to a molding sheet.

If the covering film and molding sheet are shaped by pressing them on the mold face by applying a fluid pressure to a rubber sheet arranged on the surface of the covering film, the expanding rubber sheet can be set by sufficiently pressing and tightly fixing it on the surface of covering film Thus, undesirable peeling and returning of the covering film to its original condition can be more effectively stopped.

If a rubber sheet is set in a gap which is made between it and a covering film and, then, a fluid pressure is applied to the rubber sheet, accompanied by the rubber sheet expanding with the fluid pressure, a central part followed by the circumference of the rubber sheet adheres in sequence to the covering film. The rubber sheet and covering film can be further firmly adhered, since no air is trapped in a space between the covering film and the rubber sheet. As a result, the molding sheet is shaped by pushing it against the mold face and it is possible to produce a molding having high precision and a fine concave or convex shape.

When the gap between the rubber sheet and covering film is intercepted from the circumference, if the inside of the gap undergoes pressure reduction and a fluid pressure applied to the rubber sheet, the air in the gap is quickly and surely evacuated and adhesion between the rubber sheet and covering film is enhanced.

A silicone rubber sheet can withstand a high temperature rise during a molding process, and even if the shape of molding undergoes a complicated change, the sheet can follow with elastic deformation and can be used repeatedly since it has superior elasticity, durability and heat resistance.

II. The Surface Cure Promotion Method

A. The UV Irradiation Method

If the surface layer of the molding sheet adjacent to the covering film on the side which is not in contact with the mold face has been cured by UV irradiation independent of thermal curing of the whole part, air bubbles will not enter. This is true even if a hole is opened due to local melting of the covering film which may occur from a temperature rise associated with heat generated during thermal curing of the entire molding sheet, because the surface layer of molding sheet has already been cured. Even if the covering film is peeled off or returns to its original state, the surface layer of the molding sheet will not be peeled off with the covering film and uneven irregularities will not be formed. As a result, a molding is obtained which has a flat and good finish on the face which is stuck with the covering film in the side that is not in contact with the mold face.

This molding method only requires addition of a UV curing agent to the molding sheet and UV irradiation. It is not necessary to have a complex device and process, so that it is possible to produce a molding simply and with good efficiency similar to the so-far known general molding methods.

Furthermore, the curing of the entire molding sheet may be carried out by only UV irradiation of the molding sheet surface if the molding sheet is thin. However, where the thickness of the molding sheet is similar to those commonly used for various kinds of products, the UV irradiation may not sufficiently cure the inside of the molding sheet or may take a long curing time, so that it is not practical. Therefore, in the present invention the entire molding sheet is effectively cured by a conventional thermal curing method and, in addition, the surface layer of the molding sheet is treated with UV irradiation.

If the UV irradiation is stopped before complete curing of a surface layer of the fiber-reinforced resin molding sheet, occurrence of cracks in an interior of the molding can be surely prevented and a molding of superior qualities and capacities can be produced. This is because, when a sheet or molding is thermally cured by heat-transfer from a mold face, the curing proceeds from a surface part in contact with the mold face of the molding sheet, to an interior and thereby the resin causes shrinkage accompanied with the thermal curing. In hitherto-known molding methods, curing proceeds from the mold face side of a molding sheet toward an opposite side gradually, so that the shrinkage accompanied with curing is acceptable and any constricting stress is eliminated. However, in the molding method of the present invention, when a surface layer in a side opposite to the mold face is cured by UV irradiation, curing of the molding sheet proceeds from both of the mold face side and its opposite face side, and curing of a central part turns out to be most delayed. Thus, when the central part is cured, the circumferential part is already cured, so that the shrinkage accompanied with curing is unacceptable and a constricting stress remains. As the result, cracks are formed in the interior of a produced molding. Thus, as described above, if the UV irradiation is stopped before complete cure of the molding sheet's surface layer, the surface layer turns out to be cured up to a condition where the surface layer is able to carry out a deformation in a certain degree, the central part and other parts of the molding sheet absorb the constriction accompanied with curing and, thus, occurrence of cracks is prevented. Besides, even if the surface layer of molding sheet is not sufficiently cured, if it is cured in more than a certain degree, the forementioned preventing functions for entrance of air-bubbles and generation of uneven irregularities can be fulfilled. What degree of curing is proper can be determined by repeated simple experiments.

B. The Direct Surface Heating Method

This method cures a surface layer part of the molding sheet adjacent to the covering film on a side which is not in contact with a mold face by directly heating the surface, independent of the thermal curing of the entire molding sheet by heat-transfer from a mold face. This method does not require a complex device and process, so that it is possible to produce a molding simply and very effectively which is similar to those produced hitherto-known general shaping methods.

Especially, if hot air is used for direct heating, only a surface layer part of the molding sheet can be efficiently heated. Also, since only a necessary part can be heated with local heating, heating time and heating energy can be used effectively and an attempt to improve working efficiency and economical advantage is possible.

If heating by infrared rays, especially, by far-infrared rays is adopted as the direct heating means, only the surface layer of the molding sheet can be warmed with good efficiency. Also, because the far-infrared rays are able to penetrate a covering film and to be absorbed by a resin material constituting the surface layer of molding sheet, high heating-efficiency is obtained and heating capacity is increased. The surface layer of the molding sheet which is covered with the covering film can thus be warmed with good efficiency.

C. The Method of Irradiating Electron Rays

Irradiation by electron rays has an effect similar to those obtained by UV irradiation and by direct heating. In addition, this electron rays method does not require an additive such as a UV curing agent in the molding sheet, but only needs to form a molding sheet by a usual thermosetting resin material, and therefore, production of the molding sheet is simple and its cost is low. Also, compared with blown hot air, it is possible to perform the irradiation toward a limited narrow range. It is possible to promote curing at only a local part in which melting and a breakdown easily take place. It is effectively carried out to prevent a breakdown of the covering film.

III. The Protective Layer Method

Air bubbles can no longer enter when a cured protective layer has been formed on a surface of the covering film on the side which is not in contact with the mold face, even if a hole is opened due to local melting of the covering film, because the surface of the covering film is already covered with a cured protective layer. Even though the covering film would normally peel off with constriction and to return to its original shape, such peeling-off does not take place because the film is pressed with the protective layer. Therefore, there is no case where a resin material constituting the surface part of the molding sheet peels off together with the covering film and uneven irregularities are formed. As a result, the obtained molding has a flat and good finish even on its face, with which the covering film is stuck, on the side which is not in contact with the mold face.

This molding method is enough by forming a protective layer on a surface of the covering film and adding a simple process such as curing only. It does not require a complex device and complex process. It is possible to produce a molding simply and effectively, similar to a case of hitherto-known general molding methods.

Besides, although it is considered that the protective layer is directly formed instead of placing the covering film on the surface of molding sheet, a protective layer consisting essentially of a curable material is united in one body joined to a resin material constituting the molding sheet, so that the protective layer can not be peeled alone from the molding surface. Also, the protective layer before curing can not be arranged like the covering film so that the molding sheets do not stick to each other, and also the resin material constituting the molding sheet can not be arranged so as to be protected. Accordingly, not only is the covering film placed on the face of the molding sheet, but also it is necessary to form a protective layer on the surface of the covering film.

If a curing material consisting of a protective layer is a thermosetting resin, because this thermosetting resin is a material used for conventional resin-molding, acquisition and handling are easy and curing control of the protective layer is simple. Furthermore, the working efficiency in a curing process and others is good and superior economical advantage is obtained.

A thixotropic material easily flows and moves during a coating operation such as brush-coating, and exhibits good working efficiency. Yet a protective layer formed from a thixotropic coating is difficult to flow and move, so that it is possible to maintain sufficient thickness capable of protecting the covering film.

If a protective layer is formed on the surface of the covering film before shaping of the molding sheet, because it is formed on a flat covering film, formation of the protective layer by coating or pressure application is easy. The protective layer can be reliably formed with tight adhesion to the covering film.

IV. The Cooling Method

A temperature rise on the molding sheet's surface layer is depressed and melting and a breakdown of the covering film can be avoided if a surface layer of the molding sheet opposite to the mold face is cooled together with the covering film, when the molding sheet is thermally cured.

Melting and breakdown of the covering film at a corner part of a valley shape of the mold face which is easily raised to a high temperature can be reliably prevented if the cooling is carried out at a part of the molding sheet which is set at the corner part of a valley on the mold face.

The cooling medium acts to depress a recovering force of the covering film if the cooling medium is selected in accordance with hydrophilicity or lyophilicity of the covering film. It is considered that the covering film is swelled or softened by the medium for cooling. As a result, the covering film becomes capable of changing softly its shape according to uneven irregularities on the mold face and does not cause local enlarging of thickness of the resin material with floating up of the covering film from the molding sheet. Therefore, local temperature rise due to thickness variation of the resin material can be eliminated, melting of the covering film can be prevented, and it is possible to obtain a molding of uniform thickness.

If the medium for cooling is applied to a surface of the covering film before shaping of the molding sheet, the covering film is shaped with soft deformation, so that the above-described function is reliably fulfilled.

BRIEF DESCRIPTION OF THE DRAWINGS

FIG. 19 is an enlarged view of the IV part in FIG. 18.

FIG. 20 is a cross-sectional view of a molding condition showing another example.

DESCRIPTION OF THE PREFERRED EMBODIMENTS

Embodiments of the present invention are explained below referring to figures and diagrams.

I. The Rubber Sheet Method

Figure 2:
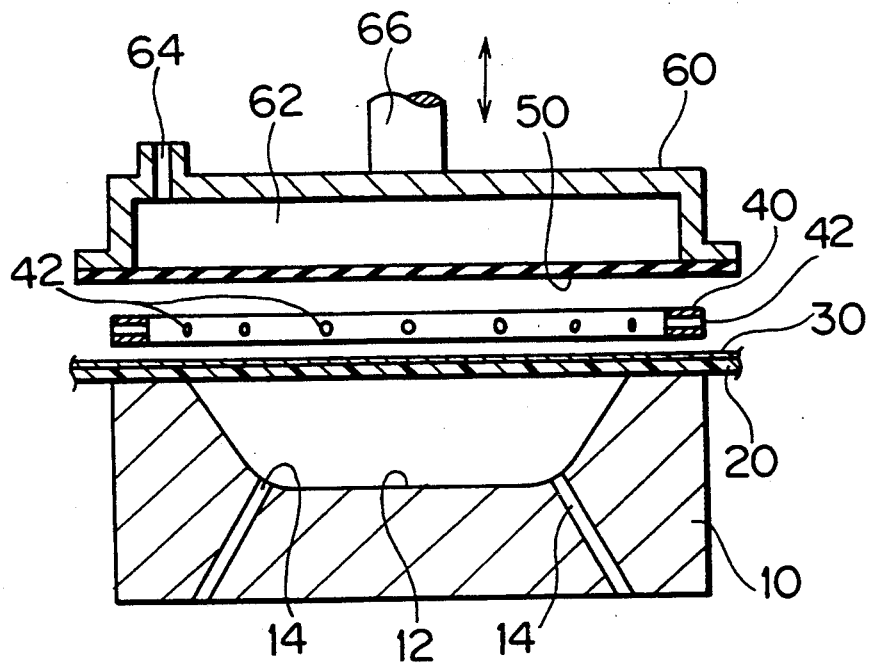
FIG. 2 is a cross-sectional view before shaping.

FIG. 2 shows an entire structure of a molding device. A molding mold 10 constituting a so-called female mold of a central concavity has a structure similar to that used for a common molding method. A vacuum-absorption opening 14 is set on a mold face 12, and it is connected to a vacuum-generating source (not shown). A heating device such as a heater etc. is arranged in an interior of the mold 10 so as to warm mold face 12.

A spacer 40 is composed of stainless steel etc. and has a low flange which encircles a periphery of mold face 12. In the spacer 40 there are formed many holes for evacuating air 42 which penetrate from a side face of the internal perimeter to a periphery side face.

A rubber sheet 50 is made of a silicone rubber etc. and set by being stuck on the lower face of a pressure box 60. The pressure box 60 is arranged with a pressure room 62 on a back side of the rubber sheet 50. There is arranged in a part of the pressure room 62 a pressure opening 64, which is connected to a pressurized air supply source (not shown). There is arranged in a upper part of the pressure box 60 an operating axis 66, which is connected to a common pressing device (not shown) so that the pressure box 60 freely moves up and down. On an upper face of the pressure box 60 an observation window (not shown) is arranged to enable an interior observation.

A fiber-reinforced resin molding sheet 20 is the same as a common molding sheet and consists essentially of a resin material such as an unsaturated polyester resin etc. and a reinforcement such as glass fiber etc. A covering film 30 is stuck on an upper face of the molding sheet 20. The covering film 30 is the same as a common covering film such as a vinylon film etc.

A molding method using a molding device and the molding sheet 20 as described above is explained with FIGS. 1-3.

At first, as shown in FIG. 2, the molding sheet 20 which is stuck with covering film 30 is arranged on the mold 10. A pressure box 60 upon which is placed the spacer 40 on covering film 30 and a rubber sheet 50 comes down.

Figure 1:
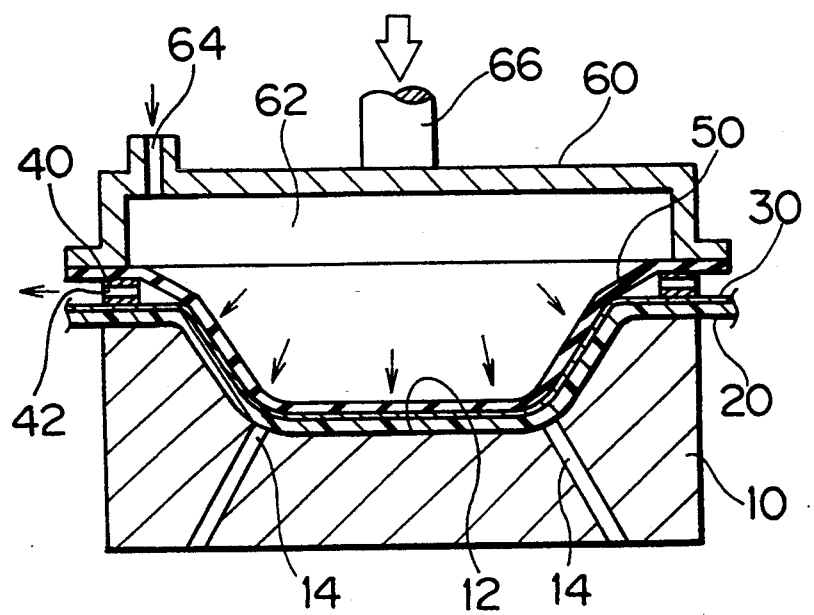
FIG. 1 is a cross-sectional view of a molding condition showing an example of the rubber sheet method of the present invention.

As shown in FIG. 1, when rubber sheet 50 is placed through spacer 40 on covering film 30, pressurized air is introduced into pressure room 62 of pressure box 60. The covering film 30 and molding sheet 20 are pushed into a side of mold face 12 with downward expansion of rubber sheet 50, as to that covering film 30 and molding sheet 20 are shaped along mold face 12. At this time, since a central part expands at first at a stage of downward expansion of rubber sheet 50, the central part of rubber sheet 50 comes at first in contact with covering film 30 and then, a part of the circumference comes gradually in contact with covering film 30. As a result, the air existing between rubber sheet 50 and covering film 30 comes out from the central part to the circumference part and is evacuated through air-evacuating holes 42 of spacer 40. Therefore, at a stage where the covering film 30 and molding sheet 20 have been pushed into mold face 12, air and space do not remain between rubber sheet 50 and covering film 30, resulting in sure and firm adhesion. Besides, upon expansion of rubber sheet 50 and upon shaping covering film 30 and molding sheet 20, because there generates an upward repulsive force in the pressure box 60, a downward press in force is beforehand added to the pressure box.

In the above-described process, shaping of the molding sheet 20 and covering film 30 can be carried out in a better manner if vacuum absorption is carried out from the vacuum absorption opening 14 of the mold 10. However, shaping can be performed without carrying out the vacuum absorption and only by adding a pressure by the rubber sheet 50. Also, if the vacuum absorption opening 14 is opened to the atmosphere, it may become to an evacuating pathway of the air which is shut in between the molding sheet 20 and mold face 12.

While the molding sheet 20 and covering film 30 are shaped, a resin material of the molding sheet 20 is thermally cured by a common heating means such as warming of the mold 10. During a period while the resin material sufficiently undergoes thermal curing in this thermal curing process, said rubber sheet 50 is adhered to the covering film 30 and molding sheet 20. In the thermal curing process, even if covering film 30 locally melts due to heat generated during the curing of a resin material, covering film 30 never returns to its original form because it is covered by rubber sheet 50.

When the resin material is sufficiently cured by heating and the molding sheet 20 is shaped to a desired shape, pressure box 60 and rubber sheet 50 are raised and returned, spacer 40 is removed, and the molding sheet 20 and covering film 30 are taken out from mold 10.

Figure 3:
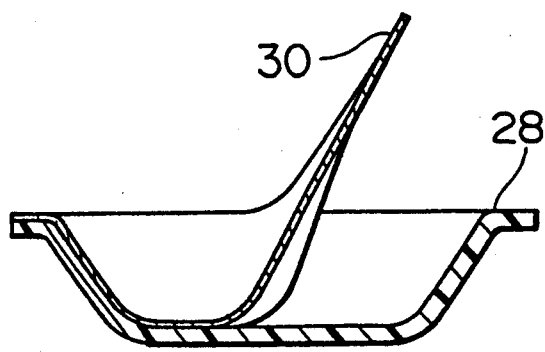
FIG. 3 is a cross-sectional view of a shaped molding.

If the molding sheet 20 undergoes a specific trimming or an outside forming, a molding 28 is obtained as shown in FIG. 3. The covering film 30 which has been stuck on a surface of the molding sheet 20 may be peeled off from a surface of the molding 28. Thus, a fiber-reinforced resin molding is produced.

In the forementioned method, although spacer 40 is used to make a gap between rubber sheet 50 and covering film 30 as described before, any means capable of achieving a similar function can be used. For example, an entire hole circumference may be constructed using a plurality of spacers of an arc or a straight line type and, a channel penetrating from a side of an outer periphery to a side of an inner-perimeter may be formed instead of air evacuating hole 42.

Figure 4A:
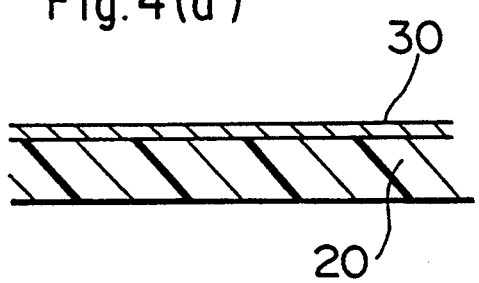
FIGS. 4(a) and (b) are cross-sectional views showing examples of respective laminated structures of the molding sheet and the covering film.
Figure 4B:
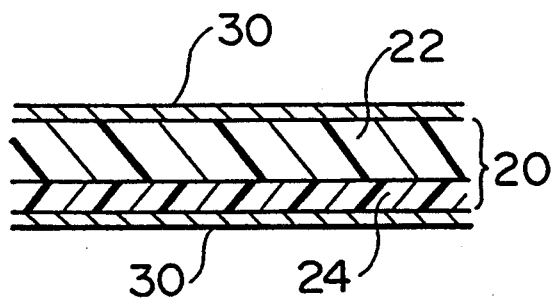

As the molding sheet 20 and covering film 30 using in such a molding method as described above, besides those in which the covering film 30 is stuck on one side of the molding sheet 20 composed of only a fiber-reinforced resin layer as shown in FIG. 4 (a), those in which the covering film 30 is stuck on both faces of the molding sheet 20 arranged with a surface resin layer 24 on one face of the fiber-reinforced resin layer 22, as shown in FIG. 4(b), may be used.

Surface resin layer 24 is usually arranged at a surface for use of the molding 28 and, is used to cover uneven irregularities due to a reinforcement fiber and to change color and appearance properties. Typical examples of the surface resin layer 24 include a surface layer made of the same material as that of fiber-reinforced resin layer 22 and which does not contain a reinforcement, a resin material having various kinds of coloring agents added thereto, a surface layer composing a surface mat laminated to a resin material, and a surface layer comprising a resin material laminated to a non-woven fabric comprising an organic fiber etc. and the like.

Figure 5:
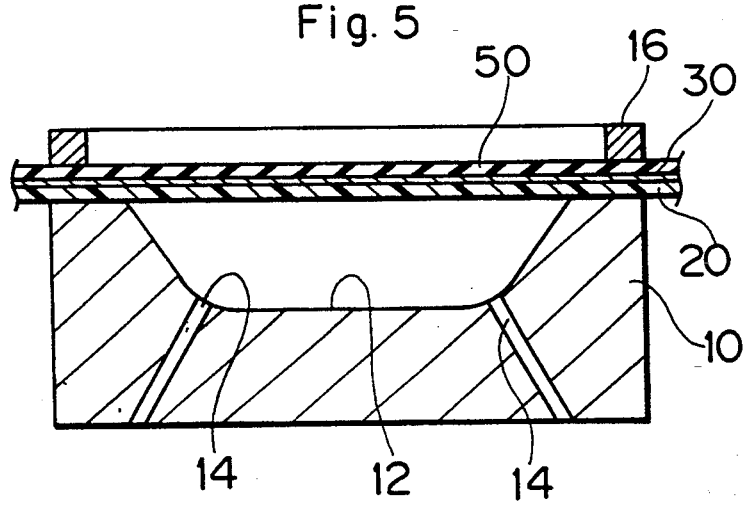
FIGS. 5 and 6 are cross-sectional views showing molding processes in sequence in different examples.
Figure 6:
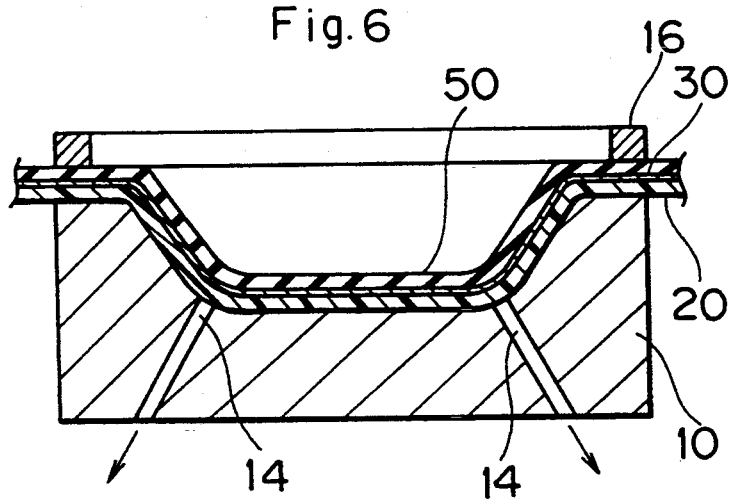

Next, FIGS. 5 and 6 show examples partly different from the forementioned examples. The same mark is given for a structural part used in the forementioned examples, so that different parts are mainly explained.

As shown in FIG. 5, the molding sheet 20 which is stuck with the covering film 30 is arranged on the mold 10, on which rubber sheet 50 is layered. At this time, no air exists between rubber sheet 50 and covering film 30, both of which are arranged so as to adhere each other on the whole face. The laminated body comprising molding sheet 20, covering film 30, and rubber sheet 50 is rigidly set with the mold 10 at a periphery part of mold face 12 of mold 10 using clamp mechanism 16.

Clamp mechanism 16 can be the same as that used for rigidly setting the molding sheet 20 to the mold 10. However, clamp mechanism 16 is arranged so as to rigidly set rubber sheet 50 together with molding sheet 20 and covering film 30.

Next, as shown in FIG. 6, upon absorbing under vacuum from the vacuum-absorbing opening 14 of the mold 10, the molding sheet 20, covering film 30, and rubber sheet 50 are pulled into an interior of mold 10 and shaped along mold face 12. At this time, if air comes in between molding sheet 20 and covering film 30 and between covering film 30 and rubber sheet 50, the shaping can not be done well, so that it is necessary that each sheet and the films 20, 30, and 50 are reliably adhered and the rigid setting by the clamp 16 is achieved.

The curing process etc. which is carried out after the shaping of the molding sheet 20 are similar to those carried out for the forementioned examples, so that explanation is omitted. This method can be relatively simply worked with a device and process identical to those for a common vacuum-molding method.

Next, examples which used practically the molding method of the present invention are explained.

Example 1.1

The fiber-reinforced resin molding sheet 20 and covering film 30 shown in FIG. 4(b) are used. That is, they are made by sticking the covering film 30 to both faces of the molding sheet 20 which is laminated with surface resin layer 24 on one face of fiber-reinforced resin layer 22.

Surface resin layer 24 was composed of the following composition (the amounts composed are shown by weight parts).

| | |
|---|---|
| Unsaturated polyester resin (EPOLAC N-325, made by Nippon Shokubai Kagaku Kogyo Co., Ltd.) | 100 parts |
| Anhydrous silicic acid fine powder | 2 parts |
| Titanium white | 10 parts |
| Styrene | 15 parts |

These materials are dispersed by a homomixer to obtain a resin material of surface resin layer 24.

A resin solution composed of 2 parts of MgO, 1 part of tertiary-butyl perbenzoate and 100 parts of the surface resin material was coated on a vinylon film resulting in the covering film 30 so as to make a layer of thickness 0.8 mm and stood for 1 day at 40° C. to increase viscosity, whereby surface resin layer 24 was prepared.

Next, using a resin solution composed of 1 part of tertiary-butyl perbenzoate and 100 parts of an unsaturated polyester resin (EPOLAC G-105, made by Nippon Shokubai Kagaku Kogyo Co., Ltd.), the resin solution and five sheets of glass fiber (MC-450A, made by Nitto Boseki Co., Ltd.) were laminated to prepare fiber-reinforced resin layer 22 on surface resin layer 24. Furthermore, covering film 30 composed of a vinylon film was laminated on the fiber-reinforced resin layer 22 and then, treated with taking-off of bubbles, whereby a laminated sheet composed of molding sheet 20 and covering film 30 was obtained.

Molding was carried out using the device and process shown in FIGS. 1–3. The mold 10 is equipped with the vacuum-absorbing opening 14 at four corners of a bottom part of mold face 12, so that a female mold having an opening part of 200×500 mm and a depth of 50 mm is formed. Rubber sheet 50 was a silicone rubber sheet of 0.7 mm thickness and 300% stretching percentages. Spacer 40 had a height of 12 mm height and was a well crib type. The mold temperature was 120° C., the pressure of pressurized air which was supplied to pressure room 62 was 5 atmospheres, and the molding time was 20 minutes. Molding sheet 20 was arranged so that the side of surface resin layer 24 was facing toward the surface of mold face 12.

The molding sheet 20 and covering film 30 were placed on the mold 10, the pressure box 60 was brought down, and an upper side of the mold 10 was closed and then, the pressure room 62 was pressurized by introducing pressured air, whereby molding sheet 20 and covering film 30 were shaped. From the time that molding sheet 20 came in contact with the mold face 12, thermal curing of molding sheet 20 was initiated with heat-transfer from the mold 10, and after about 20 minutes it was completely cured.

The molding 28 obtained had no invasion of air bubbles and no uneven irregularity on both the surface and rear side and had beautiful and good finish.

Comparison Example 1.1

The procedure of example 1.1 is repeated for shaping except that the rubber sheet was not used. Therefore, the pressure box 60 was directly placed on the covering film and pressurized air was introduced into pressure room 62.

As a result, at about 3 minutes after shaping of the molding sheet 20, a part which is a corner part on a bottom part of the covering film 30 of the side to the pressure box 60 melted causing air invasion between the covering film 30 and a resin material of the molding sheet 20, and the covering film which had been stretched constricted and returned to its original state. The resin material which was in contact with the covering film 30 and not yet cured as well as the glass fiber which was a reinforcement were pulled by the covering film 30 and floated up feather-likely. The molding finally obtained had a dirty surface and an unsatisfactory finish.

EXAMPLE 1.2

The molding sheet 20 which was produced repeating the procedure of Example 1.1 was used except that, the molding sheet 20 used in Example 1.2 did not have the surface resin layer 24 and a resin solution used was arranged with 1 part of tertiary-butyl peroxy-2-ethylhexanoate instead of 1 part of tertiary-butyl perbenzoate.

Shaping was carried out with the device and method which are shown in FIGS. 5 and 6.

Rubber sheet 50 and mold 10 was the same as that used in the Example 1.1. The mold temperature was 90° C. and the molding time 20 minutes.

As a result, similar to the case of Example 1.1, a beautiful molding having superior finish was obtained.

EXAMPLE 1.3

In Example 1.3, spacer 40 was used such that only one hole for evacuating air 42 that penetrates from a side face of the inner circumference to a side face of the periphery was formed and this hole for evacuating air 42 was connected with a vacuum-generating source. Also, in a shaping process, after an above part of the mold 10 was closed and before pressurizing air was introduced into the pressure room 62, the atmosphere in an interior of the spacer 40 was reduced by vacuum-evacuation from said hole for evacuating air 42, the rubber sheet 50 and covering film 30 were firmly stuck, and then the pressurized air was introduced into the pressure room 62. Except the forementioned, the producing conditions for shaping were the same as those in Example 1.1. As a result, there was obtained a molding having no air-invasion and uneven irregularity and having a beautiful and good finish.

EXAMPLE 1.4

Spacer 40 was used and had air-evacuating holes 42 penetrating from the inner-perimeter side face to the periphery side face were made at each side center of the flange of a well-crib shape and each of the holes 42 were connected with a vacuum source. In the molding process, after an above side of the mold 10 was closed, pressurized air was introduced into the pressure room 62 and with this, the inside of spacer 40 was led to a reduced pressure by evacuating under vacuum from said air-evacuating hole 42. With these exceptions, the molding procedure of Example 1.1 was repeated. As a result, a molding was obtained which had no air-bubble invasion and no uneven irregularity on both the surface side and rear side and which showed a pretty and superior finish.

II. The Surface Cure Promotion Method

A. UV Irradiation Method

A fundamental structure of the molding device is the same as that in the previous examples and, therefore, such points common to those are omitted from further detailed explanation.

Figure 7:
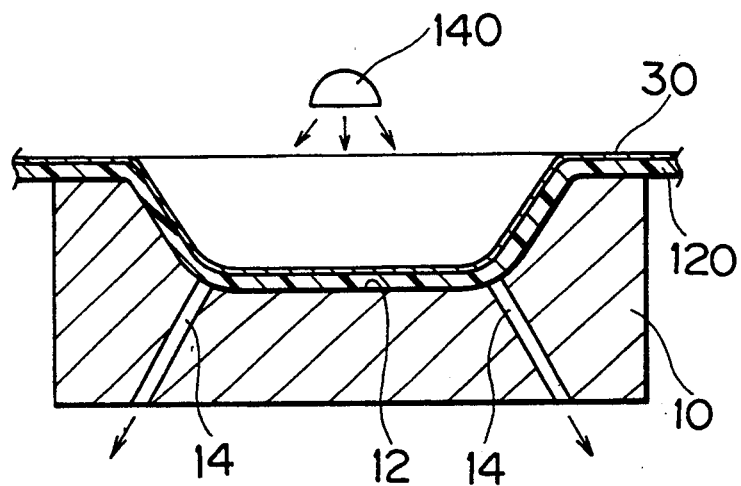
FIG. 7 is a cross-sectional view of a molding condition showing an example of the UV irradiation method.

In this example, a means for irradiating ultraviolet rays such as UV lamp 140 is arranged above mold 10 as shown in FIG. 7 instead of a structure relating to the rubber sheet in the previous examples.

Fiber-reinforced resin 120 used for the molding sheet is the same as a conventional molding sheet resin and consists essentially of a resin material such as an unsaturated polyester resin and a reinforcing fiber such as a glass fiber. However, a UV curing agent is added to the molding sheet 120, or at least to a surface layer in a side opposite to the mold face 12. On an above face of the molding sheet 120, the covering film is stuck.

A molding method using the molding device and molding sheet 120 as described above is explained below.

First, as shown in FIG. 7, molding sheet 120 and covering film 30 are arranged on mold 10, molding sheet 120 and covering film 30 are absorbed into the mold by absorbing those under vacuum from vacuum-absorption opening 14 of mold 10, and thus molding sheet 120 is shaped along mold face 12. Thermal curing of molding sheet 120 is initiated with heat-transfer from mold face 12 when molding sheet 120 comes in contact with mold face 12.

Figure 8:
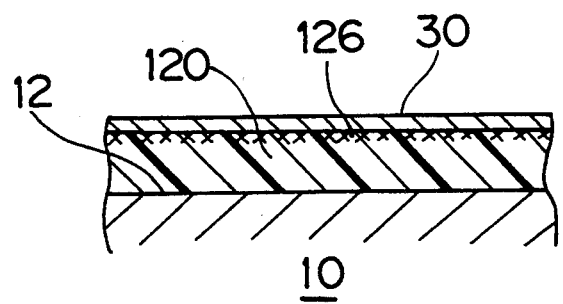
FIG. 8 is an enlarged cross-sectional view of an important part in the preceding view.

By the action of UV lamp 140, the surface layer 126 of molding sheet 120 undergoes UV curing. The surface layer 126 is covered by covering film 30 and the other surface layer of molding sheet 120 faces the mold face 12. As shown in FIG. 8, in the molding sheet 120, the surface layer 126 (shown by a cross x) adjacent to covering film 30 is cured. At this stage, the thermal curing of the entire molding sheet 120 by heat-transfer from mold face 12 does not yet so progress and the heat-generation accompanied with thermal curing does not create a temperature at which melting of covering film 30 may take place.

Irradiation by UV lamp 140 finishes and then, through a conventional thermal curing process the entire molding sheet 120 is cured. At this stage, although there is a case where the heat-generation accompanied with the thermal curing causes local melting of the covering film 30, this is no trouble because surface layer 126 of molding sheet 120 has already been cured.

The molding sheet 120 and covering film 30 are taken out from the mold 10 when the resin material is sufficiently thermally cured and molding sheet 120 is shaped according to a desired shape.

Figure 9:
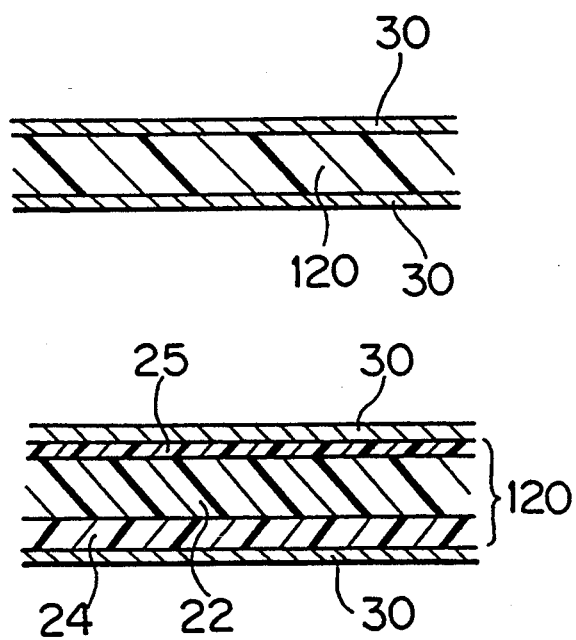
FIGS. 9(a) and (b) are cross-sectional views showing examples of respective laminated structures of the molding sheet and the covering film.

Also, molding sheet 120 and covering film 30 used in such a method described above can be the structure shown in FIG. 9(a). The structure shown in FIG. 9(a) is such that the entire molding sheet 120 is made by a fiber-reinforced resin layer being added with a UV curing agent and both sides of molding sheet 120 are stuck with covering film 30. Therefore, covering film 30 is arranged on the side of mold face 12, too. The structure shown in FIG. 9(b) is such that molding sheet 120 consists of laminating a surface resin layer 24 and a fiber-reinforced resin layer 25, respectively, to the latter of which a UV curing agent is added, on both sides of a usual fiber-reinforced resin layer 22 not containing a UV curing agent and then, on both sides of molding sheet 120 the covering film 30 are stuck.

Next, are explained practical examples wherein the method for molding in the present invention is used.

EXAMPLE 2.1

The molding sheet 120 and covering film 30 which have a structure shown in FIG. 9(b) are used. That is, molding sheet 120 is prepared by laminating fiber-reinforced resin layer 25, to which a UV curing agent is added, and the surface resin layer 24, respectively, on both sides of the fiber-reinforced resin layer 22 and the covering film 30 are stuck on both sides of molding sheet 120.

The structure of each layer is disclosed below. The amounts of compositions are shown by weight parts.

| | | |
|---|---|---|
| (a) | Covering film 30 | vinylon film |
| (b) | Layer containing UV curing agent 25 (thickness, about 1 mm) | |
| | Unsaturated polyester resin (EPOLAC G-103, made by Nippon Shokubai Kagaku Kogyo Co., Ltd.) | 100 parts |
| | tertiary-Butyl peroxy-2-ethylhexanoate (thermal curing agent) | 1 part |
| | Benzoin methyl ether (UV curing agent) | 1 part |
| | MgO | 2 parts |
| | Glass mat, 1 layer (glass contents, about 33%) | |
| (c) | Fiber-reinforced resin layer 22 (thickness, about 2 mm) | |
| | Unsaturated polyester resin (EPOLAC G-103) | 100 parts |
| | tertiary-Butyl peroxy-2-ethylhexanoate (thermal curing agent) | 1 part |
| | MgO | 2 parts |
| | Glass mat, 2 layers (glass contents, about 33%) | |
| (d) | Surface resin layer 24 (thickness, about 0.7 mm) | |
| | Unsaturated polyester resin (EPOLAC N-325, made by Nippon Shokubai Kagaku Kogyo Co., Ltd.) | 100 parts |
| | Anhydrous silicic acid fine powder | 2 parts |
| | Styrene | 15 parts |
| | tertiary-Butyl peroxy-2-ethylhexanoate (thermal curing agent) | 1.1 part |
| | MgO | 2.2 parts |

Shaping was performed using the device shown in FIG. 7. The temperature of mold 10 was 90° C. The sheet for shaping 120 was arranged so that the surface resin layer 24 is in the side of mold 120.

Molding sheet 120 and covering film 30 were placed on mold 10. The terminal parts of the mold 10, molding sheet 120, and covering film 30 were sealed and fixed, and then the molding sheet 120 and covering film 30 were shaped by carrying out vacuum-absorption from the vacuum-absorption opening 14. Next, UV irradiation was performed for 60 seconds with UV lamp 140. At 20 minutes after shaping, the mold was taken off and the covering film 30 was peeled off, whereby a molding was obtained which showed no air-bubble invasion and no uneven irregularity in both surface and rear sides. Instead, the molding was flat and had a beautiful appearance and superior strength.

Comparison Example 2.1

The shaping procedure of example 2.1 was repeated except that UV irradiation was not performed.

As a result, at about 4 minutes after the shaping, the covering film floated up, whereby the surface of a molding obtained showed a very napped condition on a part where the covering film was peeled off, so that the molding did not have a satisfactory finish.

EXAMPLE 2.2

Molding sheet 120 and covering film 30 having a structure shown in FIG. 9(a) were used.

The structure of each layer was as follows. (The amounts of composition are shown in weight parts.)

| | | |
|---|---|---|
| (a) | Covering film 30 | vinylon film |
| (b) | Molding sheet 120 (fiber-reinforced resin layer with UV curing agent added [thickness, about 5 mm]) | |
| | Vinylester resin (EPOLAC RF-1001, made by Nippon Shokubai Kagaku Kogyo Co., Ltd.) | 100 parts |
| | Benzoyl peroxide (thermal curing agent) | 1 part |
| | Ilgacure 651 (UV curing agent, made by Chiba Gygi Co.) | 0.3 part |

| | |
|---|---|
| Glass mat, 7 layers (glass contents, about 42%) | |

The device for molding and process were the same as those of Example 2.1, while the UV irradiation time was 20 seconds.

A molding obtained at 20 minutes after shaping showed a beautiful and superior finish similar to Example 2.1.

B. The Direct Surface Heating Method

Detailed explanation is omitted for such points common to the previous examples since a fundamental structure of the molding device is the same.

Figure 10:
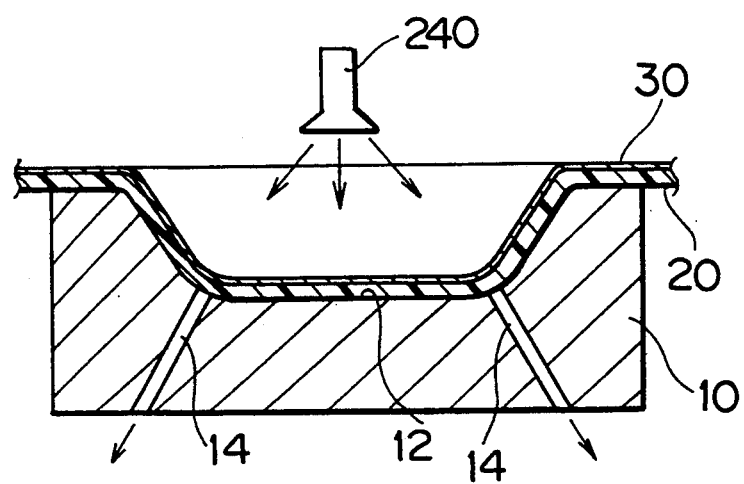
FIG. 10 is a cross-sectional view of a molding condition showing an example of the direct surface heating method.

In this example, as shown in FIG. 10, a hot air device 240 for blowing hot air is arranged above mold 10.

As shown in FIG. 10, the molding sheet 20 which has been attached to the covering film 30 is arranged above mold 10, a vacuum absorption is carried out from vacuum-absorption opening 14 of mold 10, in order to absorb molding sheet 20 and covering film into the mold and to shape those along mold face 12. When the molding sheet 20 comes in contact with the mold face 12, thermal curing is initiated by heat-transfer from mold face 12.

Figure 11:
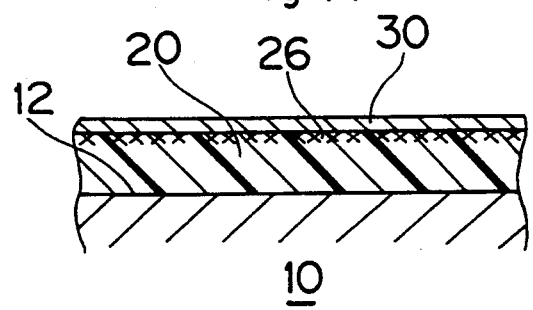
FIG. 11 is an enlarged cross-sectional view of an important part in the preceding view.

Hot air device 240 blows hot air on a surface of the molding sheet 20 to carry out thermal curing of the surface layer part 26. The surface layer part 26 is covered by covering film 30 and the other surface layer part of molding sheet 20 faces mold face 12. As the temperature of the hot air becomes higher, curing of a resin material of molding sheet 20 is accelerated, but if it is too high, the covering film will be melted. Therefore, curing is carried out at a temperature which does not melt covering film 30. As shown in FIG. 11, in molding sheet 20, surface layer part 26 (indicated by the cross x marks) which is adjacent to the covering film 30 of the surface side is cured. At this stage, thermal curing of the entire molding sheet 20 by heat-transfer from the side of mold face 12 does not occur, and the heat-generation accompanied with thermal curing does not cause such a high temperature as to cause melting of the covering film 30.

After operation of hot air device 240 stops, through a conventional thermal curing process, the entire molding sheet 20 is cured. At this stage, although there is a case where the covering film 30 locally melts by heat-generation accompanied with thermal curing, it does not cause any problem because the surface layer 26 of molding sheet 20 has been thermally cured.

The molding sheet 20 and covering film 30 are removed from the mold 10 when a resin material undergoes sufficient thermal curing and molding sheet 20 is shaped according to a desired shape.

The molding sheet 20 and covering film 30 which are used in the forementioned molding methods may also have a structure shown in FIG. 4(b).

EXAMPLE 3.1

A molding sheet 20 and a covering film 30, as shown in FIG. 4 (b), were used. That is, the molding sheet 20 was such that surface resin layer 24 was laminated on one side of fiber-reinforced resin layer 22, both sides of the molding sheet 20 were stuck with covering film 30.

The structure of each layer was as follows. (The amounts of compositions are shown by weight parts.)

| | | |
|---|---|---|
| (a) | Covering film 30 | vinylon film |
| (b) | Fiber-reinforced resin layer 22 (thickness, about 3 mm) | |
| | Unsaturated polyester resin (EPOLAC G-103) | 100 parts |
| | tertiary-Butyl peroxy-2-ethylhexanoate (thermal curing agent) | 1 part |
| | MgO | 2 parts |
| | Glass mat, 1 layer (glass contents, about 33%) | |
| (c) | Surface resin layer 24 (thickness, about 0.7 mm) | |
| | Unsaturated polyester resin (EPOLAC N-325, made by Nippon Shokubai Kagaky Kogyo Co., Ltd.) | 100 parts |
| | Anhydrous silicic acid fine powder | 2 parts |
| | Styrene | 15 parts |
| | tertiary-Butyl peroxy-2-ethylhexanoate (thermal curing agent) | 1.1 parts |
| | MgO | 2.2 parts |

Molding was performed using a device shown in FIG. 10. Temperature of mold 10 was 90° C. The molding sheet was arranged so as to be the side of surface resin layer 24 on the face side of mold 12.

The molding sheet 20 and covering film 30 were placed above mold 10 and the terminal parts of mold 10, molding sheet 20, and covering film 30 were sealed and fixed. Then, the molding sheet 20 and covering film were shaped by absorbing them under vacuum from the vacuum-absorption opening 14. Next, hot air (150° C.) was immediately blown by hot air device 240. The surface layer of the molding sheet 20 was cured after about 30 seconds and the hot air blowing was stopped. At 20 minutes after shaping, the mold was taken off and the covering film was peeled off. The molding obtained had no air-bubble invasion and no uneven irregularity on both the surface side and rear side, showed a flat, smooth, and pretty appearance, and was superior in strength.

Comparison Example 3.1

The procedure of Example 3.1 was repeated for shaping except that hot air curing was not performed.

As a result, at about 4 minutes after shaping of molding sheet 20, the covering film floated up and the surface of a molding obtained showed a very napped condition where the covering film was peeled off, so that the molding did not have a satisfactory finish.

Example 3.2

The procedure of Example 3.1 was repeated for shaping except that a far-infrared rays heater was used instead of hot air device 240.

After shaping of molding sheet 20 and covering film 30, when direct heating of the surface by the far-infrared rays heater was initiated, the surface layer of the molding sheet 20 was cured during about 40 seconds.

As a result, a molding obtained had a superior finish similar to that of Example 3.1.

III. The Protective Layer Method

Detailed explanation is omitted for such points common to the previous examples since a fundamental structure of the molding device is the same.

Figure 13:
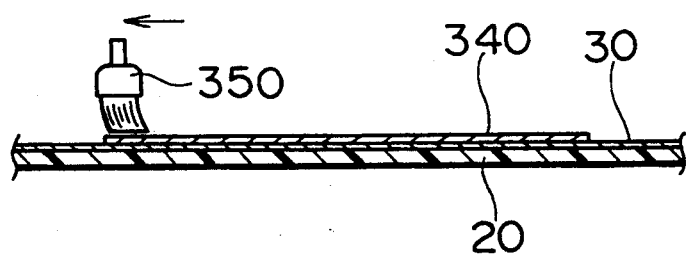
FIG. 13 is a cross-sectional view showing a process for forming a protective layer.

FIG. 13 shows a method for forming protective layer 340. When a laminated body consisting of covering film 30 being stuck on the molding sheet 20 is in a flat state, protective layer 340 is formed by coating a defined curable material on the surface of covering film 30 by using a brush 350 etc. The protective layer is only required to be formed around the parts of molding sheet 20 and covering film 30 which correspond to face 12 of mold 10. In this example, a curable material is added to a thermosetting resin and, with passage of time, the protective layer 340 formed by coating on the surface of covering film 30 slowly proceeds to cure.

Figure 12:
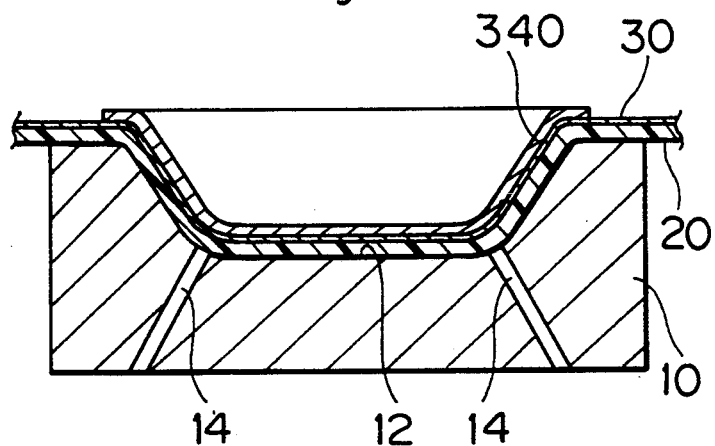
FIG. 12 is a cross-sectional view of a molding condition showing an example of the protective layer method.
Figure 14:
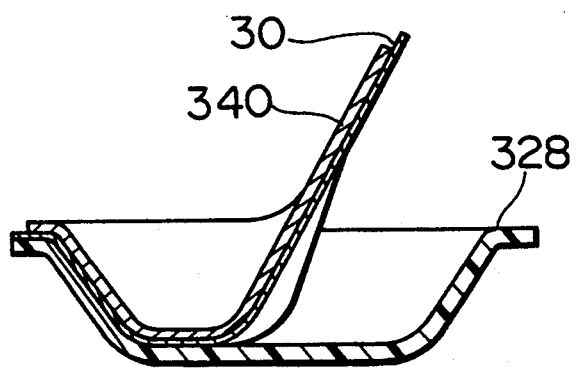
FIG. 14 is a cross-sectional view of a shaped molding.

The method for molding using the above-mentioned device for molding and molding sheet 20 is explained according to FIGS. 12 and 14.

First, as shown in FIG. 12, molding sheet 20 is arranged above mold 10 together with covering film 30 comprising the protective layer is stuck, and molding sheet 20 and covering film 30 are absorbed into the mold by vacuum-absorption from vacuum-absorption opening 14 and shaped along mold face 12. When molding sheet 20 comes in contact with mold face 12, thermal curing is initiated with heat-transfer from mold face 12.

Protective layer 340 formed on the surface of covering film 30 is cured by a curing action of itself as well the curing which is promoted by transmitted heat. Besides, at this stage the thermal curing of the entire molding sheet 20 due to heat transfer from the side of mold face 12 does not proceed and the heat-generation accompanied with the thermal curing does not create such a high temperature so as to melt covering film 30.

Protective layer 340 is cured to a sufficient hardness before thermal curing molding sheet 20 proceeds to a point where the covering film 30 is raised to such a high temperature as to be locally melted. After that, the entire molding sheet 20 is cured. At this stage, although there is a case where covering film 30 locally melts by heat-generation accompanied with thermal curing, it is no problem because the surface of covering film 30 is covered with protective layer 340 which has already cured.

When the resin material is thermally cured enough and the molding sheet 20 is shaped in a desired shape, the molding sheet 20, covering film 30, and protective film 340 are removed from mold 10.

If the molding sheet 20 is treated with defined trimming and external processing, a molding 328 is obtained as shown in FIG. 14. The covering film 30 and protective layer 340 which have been stuck on the surface of molding sheet 20 may be peeled off from a surface of the molding 328. Since the protective layer 340 has cured when it is peeled off together with the covering film 30, there is a possibility of cleaving and breaking. However, because a role of the protective layer 340 has finished at this stage, such breakdown of the protective layer 340 causes no problem. Thus, a process for producing a fiber-reinforced resin molding is completed.

Figure 15:
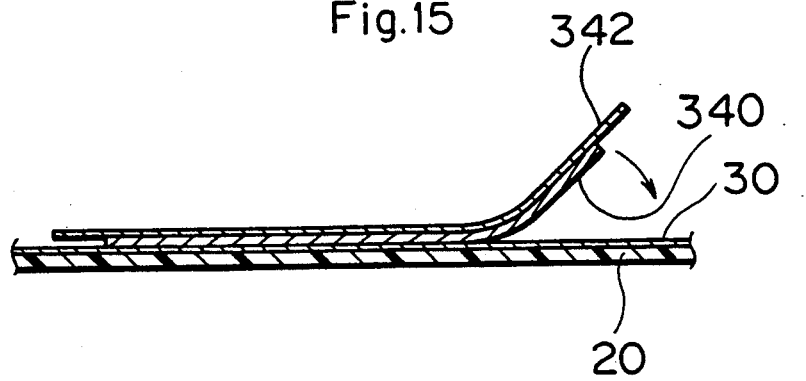
FIG. 15 is a cross-sectional view showing another example of a process for forming a protective layer.

FIG. 15 shows another example of a means which forms the protective layer 340 for covering film 30 that is stuck to molding sheet 20. In this example, the covering film is not directly coated with a curable material. Instead, protective layer 340 is formed by coating a curable material on a surface of supporting film 342. This supporting film 342 is laminated on a surface of the covering film 30 as to be the protective layer in an interior, and it is united into one body with the covering film 30 by an adhesive character of protective layer 340. After that, supporting film 342 being laminated and the molding sheet 20 being set on the mold 10, the above-mentioned shaping and thermal curing processes can be carried out. The molding 328 is obtained and then, the protective film 340 and supporting film 342 together with covering film 30 may be peeled off. Besides, in advance of the shaping process, only the supporting film may be peeled off from covering film 30.

The supporting film 342 using for the above method can be any film composed of an optional material so long as it is capable of supporting a curable material which forms protective layer 340. However, a material capable of shaping is preferred for use as supporting film 342 in a case where shaping of molding sheet 20 and covering film 30 are carried out under a condition of the supporting film 342 being stuck. Also, in a case where the protective layer 340 is cured by UV radiation, a material capable of transmitting ultraviolet rays is used as supporting film 342. As a practical material of the supporting film 342 can be used, for example, a material similar to that used for the above-mentioned covering film 30.

EXAMPLE 4.1

A fiber-reinforced resin and the covering film 30, as shown in FIG. 4(b) were used. That is, molding sheet 20 was laminated with surface resin layer 24 on one side of fiber-reinforced resin layer 22 and, further, both the sides of the thus-laminated molding sheet 20 were stuck with covering film 30.

The structure of each layer was as follows. (The amounts of compositions are shown in weight parts.)

| (a) | Covering film 30 | vinylon film |
|---|---|---|
| (b) | fiber-reinforced resin layer 22 (thickness, about 3 mm) | |
| | Unsaturated polyester resin (EPOLAC G-103) | 100 parts |
| | tertiary-Butyl peroxy-2-ethylhexanoate (thermal curing agent) | 1 part |
| | MgO | 2 parts |
| | Glass mat, 1 layer (glass contents, about 33%) | |
| (c) | Surface resin layer 24 (thickness, about 0.7 mm) | |
| | Unsaturated polyester resin (EPOLAC N-325, made by Nippon Shokubai Kagaku Kogyo Co., Ltd.) | 100 parts |
| | Anhydrous silicic acid fine powder (a thixotropic agent) | 2 parts |
| | Styrene | 15 parts |
| | tertiary-Butyl peroxy-2-ethylhexanoate (thermal curing agent) | 1.1 parts |
| | MgO | 2.2 parts |
| (d) | Protective layer 340 (thickness, about 2 mm) | |
| | Unsaturated polyester resin (EPOLAC P-551 Z, made by Nippon Shokubai Kagaku Kogyo Co., Ltd.) | 100 parts |
| | Anhydrous silicic acid fine powder (a thixotropic agent) | 2 parts |
| | Methyl ethyl ketone peroxide (curing agent) | 3 parts |

A curable precursor to the protective layer 340 was prepared by dispersing in an unsaturated polyester resin a fine powder of anhydrous silicic acid (a thixotropic agent) by means of a high speed agitator (Homomixer) and by adding methyl ethyl ketone peroxide, which forms a curing agent just before coating. Therefore, curing of the curable material has begun when the curing agent is added.

Shaping was performed using the device and process as shown in FIGS. 12–14. Temperature of mold 10 was 90° C. The side of surface resin layer 24 was arranged on the side of mold face 12.

The molding sheet 20 and covering film 30 were placed on mold 10, and the mold 10, molding sheet 20, and covering film 30 were sealed and fixed, and the previously described curable material was coated thereupon with a brush. Next, the molding sheet 20 and covering film 30 were shaped by absorbing under vacuum from the vacuum-absorption opening 14. The protective layer 340 was cured at about 35 seconds after shaping of the molding sheet 20. At 20 minutes after shaping, the mold was taken out and the covering film 30 and protective layer 340 were peeled off, whereby the obtained molding 328 had no air-bubble invasion and no uneven irregularity, showed a flat and pretty appearance, and was superior in strength.

Comparison Example 4.1

The procedure of Example 4.1 was repeated for shaping except that the protective layer was not formed.

As a result, at about 4 minutes after shaping of the molding sheet 20, because the covering film 30 which corresponds to a corner part of the bottom face in a part of mold face 12 of mold 10 melted, a whole part of the covering film floated up, and the molding obtained showed a very napped condition in the peeled-off part and did not have a satisfactory finish.

EXAMPLE 4.2

The procedure of example 4.1 was repeated for shaping except that a method for forming the protective layer 340 was changed.

The protective layer 340 was formed by setting the molding sheet 20 and covering film 30 on the mold 10 and by brush-coating the forementioned curable material on the surface of covering film 30 in a part which corresponds to a corner part of the bottom face.

As a result, a superior finish similar to that of the Example 4.1 was obtained. Compared with results from said example for comparison 4.1, it is seen as enough if the protective layer 340 is formed at only a part where the protective film 30 has a possibility of melting.

EXAMPLE 4.3

The procedure of Example 4.1 was repeated for shaping except that the undermentioned material was used as a curable material precursor of the protective layer 340 and cured by UV irradiation.

Composition of the protective layer 340 was as follows:

| (d) Protective layer 340 (thickness, about 2 mm) | |
| --- | --- |
| Unsaturated polyester resin EPOLAC G-103) | 100 parts |
| Anhydrous silicic acid fine powder (a thixotropic agent) | 2 parts |
| Benzoin methyl ether (a UV curing agent) | 3 parts |

Protective layer 340 is formed by coating the forementioned curing material with a brush on the surface of covering film 30 and molding sheet 20 and covering film 30 were shaped, and then a UV lamp of 80 watt/cm was employed from a distance of about 10 cm from protective layer 340, which was cured after about 20 seconds of UV irradiation.

As a result, the molding 328 obtained had a superior finish similar to that obtained in Example 4.1.

EXAMPLE 4.4

The procedure of Example 4.3 was repeated for shaping except that a method for forming the protective layer 340 was changed.

The method illustrated in FIG. 15 was used to form the protective layer 340. First, a resin solution, which was the same as that used for Example 4.3 and obtained by additionally mixing 1 part by weight of MgO per 100 parts by weight of a curable material, was coated in a 1 mm thickness on a surface of the supporting film 342 and beforehand enriched in viscosity for 1 day at 40° C. The thus prepared supporting film 342, was stuck with the protective layer 340 being beforehand enriched in viscosity. Next, supporting film 342 and protective layer 340 were together stuck on the surface of covering film 30, which is already stuck with molding sheet 20 and is in an opposite side of surface resin layer 24.

In this fashion, a laminated layer consisting of the molding sheet 20, covering film 30, and the protective layer 340 being arranged with the supporting film 342 was set to the mold 10 and then, the shaping and thermal curing processes were carried out in a manner similar to that illustrated in Example 4.3. Besides, the protective layer 340 was cured, just after shaping, by UV radiation. Therefore, as the supporting film 342 was used a transparent film, through which ultraviolet rays transmit. The protective layer 340 was cured about 20 seconds after the UV irradiation.

As a result, the molding 328 obtained had a superior finish similar to the case of Examples 4.1 and 4.3.

EXAMPLE 4.5

The procedure of Example 4.2 was repeated for shaping except that the undermentioned material was used as a curable precursor material to protective layer 340.

| (d) Protective layer 340 (thickness, about 2 mm) | |
| --- | --- |
| Polypropylene glycol (number-averaged molecular weight 600) | 2 moles |
| Glycerol | 1 mole |
| MDI (methylenediphenyl isocyanate) | 3.5 moles |
| Dibutyltin laurate (0.05% by weight per a total amount) | |

The protective layer 340 was cured at about 20 seconds after being coated on covering film 30.

As a result, the obtained molding 328 had a superior finish similar to the case of Examples 4.1 and 4.2.

IV. The Cooling Method

Detailed explanation is omitted for such points common to the previous examples since a fundamental structure of the molding device is the same.

Figure 16:
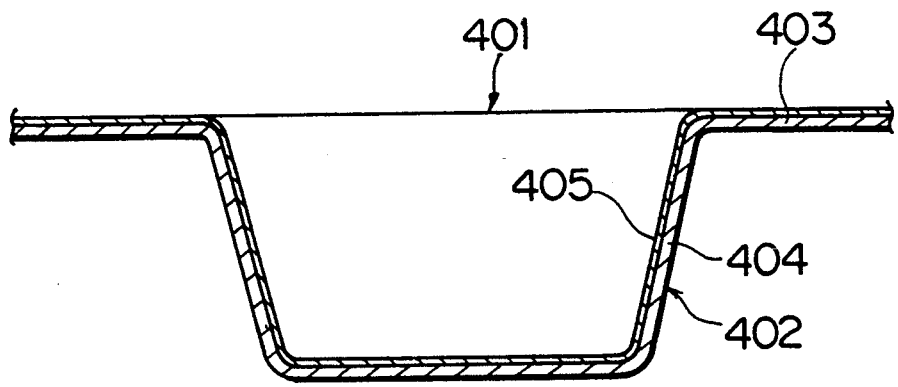
FIG. 16 is a cross-sectional view of a molding showing an example of the cooling method.

FIG. 16 shows the molding 401, which has a box-shaped main body 402 and a flange part 403 which is provided at a whole periphery of the opening part of main body 402. Molding 401 is a laminated body consisting of outer-faced fiber-reinforced resin layer 404 on an exterior and inner-faced resin layer 405 on an interior, and which does not contain a reinforcing fiber.

Figure 17:
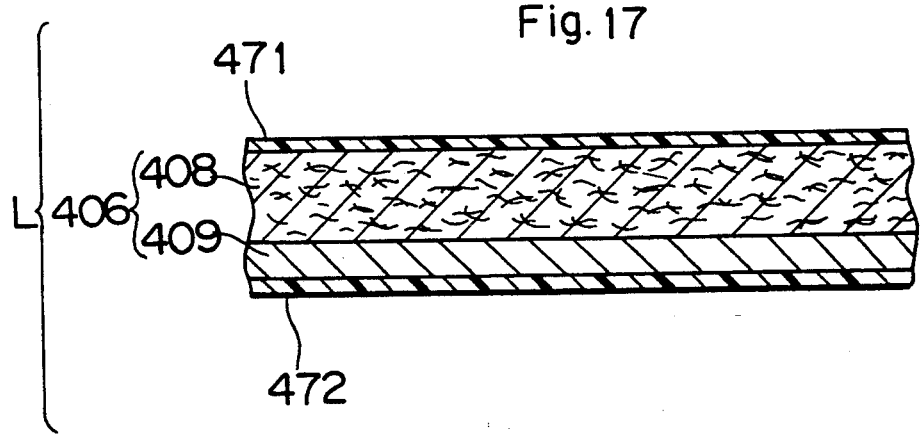
FIG. 17 is a cross-sectional view of a laminated sheet used for shaping.

FIG. 17 shows a laminated sheet L consisting of the molding sheet 406, which is used for obtaining molding 401, and the covering films 471 and 472. The laminated sheet L is obtained by placing the molding sheet 406 between the upper covering film 471 and lower covering film 472, wherein the molding sheet 406 consists of a base material layer 408, which is not yet cured and located on a side of upper covering film 471, and a synthetic resin solution layer 409 which is located on a side of lower covering film 472. The upper and lower covering films 471 and 472 consist of a material similar to covering film 30 in the above-mentioned examples. The base material layer not yet cured 408 corresponds to the fiber-reinforced resin layer 22 in the above-mentioned examples and the synthetic resin layer 409 corresponds to the surface resin layer 24 in the above-mentioned examples, and the resin material and reinforcing fiber used are similar to those in the previous examples. The base material layer not yet cured 408 constitutes the fiber-reinforced resin layer 404 of the molding 401 and the synthetic resin solution layer 409 constitutes the inner-faced resin layer 405 of the molding 401.

Next, an example for practically producing the laminated sheet L is explained.

| | |
|---|---|
| Unsaturated polyester resin (EPOLAC N-325, made by Nippon Shokubai Kagaky Kogyo Co., Ltd.) | 100 parts |
| Anhydrous silicic acid powder | 2 parts |
| Titanium dioxide pigment | 10 parts |
| Styrene (a crosslinking reagent) | 15 parts |

A mixture solution was obtained by pouring said materials with mixing into a high-speed agitator (Homomixer). Next, a synthetic resin solution was prepared by adding 1.5 parts of magnesium oxide and 1 part of tertiary-butyl peroxy 2-ethylhexanoate (a catalyst for curing) to 100 parts of the mixture solution.

This synthetic resin solution was coated in a 1-2 mm thickness on the upper face of the lower part covering film 472 of thickness 50 μm consisting of vinylon and, on this coated face, viscosity enriching was carried out at 40° C. for 3 hours to form a synthetic resin solution layer 409. This synthetic resin solution generates heat during thermal curing.

By adding 1 part of tertiary-butyl peroxy 2-ethylhexanoate to 100 parts of an unsaturated polyester resin (EPOLAC G-105, made by Nippon Shokubai Kagaku Kogyo Co., Ltd.) was prepared a synthetic resin solution which is used as a not-cured base material (hereinafter, the term "a not-cured material" is used in the same mean to the "a material not yet cured"). This synthetic resin solution also generates heat during thermal curing. Also, a fiber aggregation for reinforcement was prepared by laminating three sheets of glass fiber cloths (C-450A, made by Nitto Boseki Co., Ltd.). The fiber aggregation was immersed to contain said synthetic resin solution and laminated on said synthetic resin solution layer 409 to form the not-cured base material layer 408 of thickness 2-3 mm and, on this not-cured base material layer 408, the upper part covering film 471 of thickness 50 μm consisting of vinylon was laminated, and a laminated product thus-obtained was treated with defoaming, whereby the laminated sheet L consisting of the molding sheet 406 and covering films 471 and 472 was obtained.

FIG. 18 shows a method for producing the molding 401.

The device for production 410 is equipped with a female type mold 411 and the pressure box 412 set below the mold 411, both of which freely go up and down. The mold 411 is equipped with concavity 413, which opens downward, and a plural absorbing hole 414, which opens on a ceiling face of the concavity 413, and these absorbing holes 414 are connected with the vacuum-source 415. At the concavity 413, the opening part size is 400 mm long, 200 mm wide, the inner-perimeter face angle is 10° against the ceiling face, and the depth is 150 mm.

Mold face S of mold 411 consists of the inner-perimeter face $S_1$ of concavity 413 and the ceiling face $S_2$ and the connecting part between the inner-perimeter face $S_1$, and the ceiling face $S_2$ is the corner part of a valley shape C.

The pressure box 412 has a concavity 416 which opens upward, and in concavity 416 a plural nozzle 417 is set, from which a gas as a cooling means blows out, and each nozzle is connected with a cool air-supplying source 418, while air-evacuating hole is shown as 412a.

The following processes are executed in sequence to produce molding 401. In this case the temperature of mold 411 was set at 90° C.

Figure 18A:
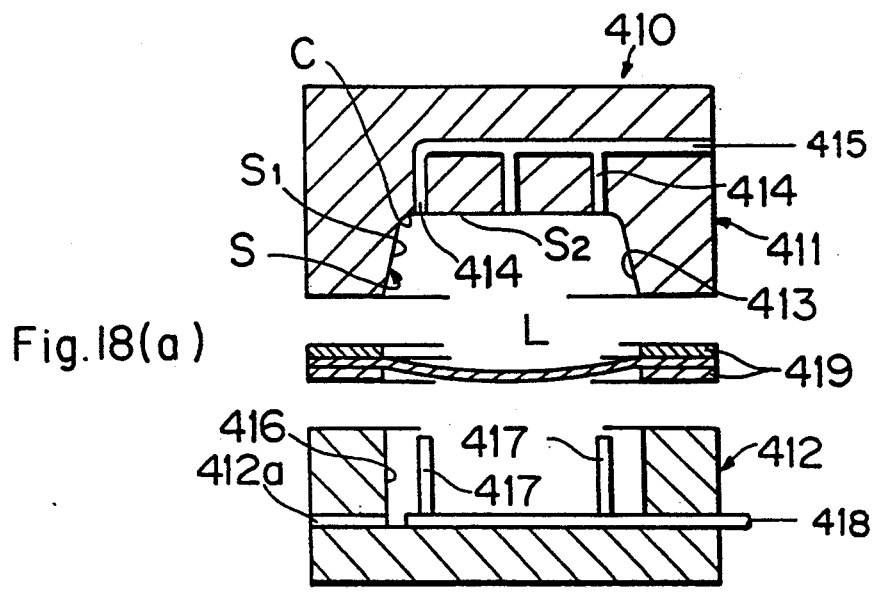
FIG. 18(a)-(c) are cross-sectional views showing a molding method in an order of the processes.

(i) As shown in FIG. 18(a), the mold 411 went up and the pressure box 412 went down and between these the laminated sheet L being held by the supporting flange 419 was arranged in a manner that the downward flexible film 472 came in the lower side, and then the laminated sheet L was beforehand warmed by a heater (not shown).

Figure 18B:
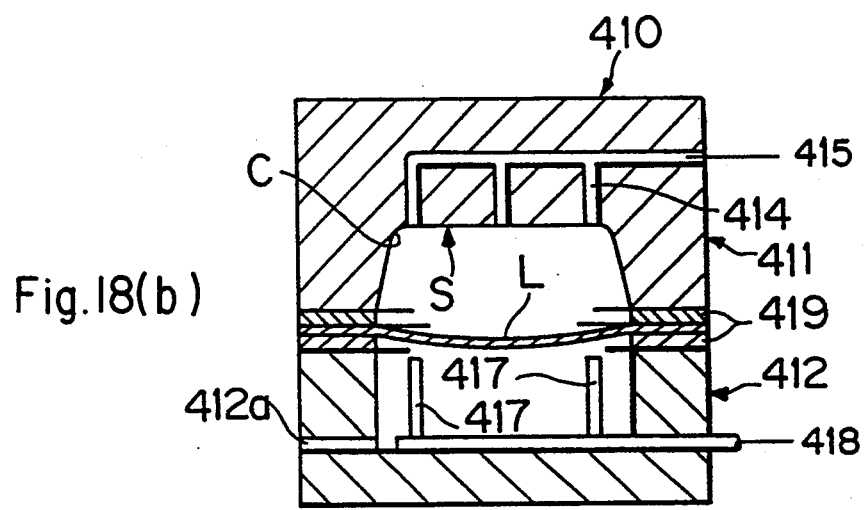

(ii) As shown in FIG. 18(b), mold 411 went down and pressure box 412 went up and the supporting flange 419 was set between these 411 and 412. By doing these, the flange part 403 of molding 401 was shaped.

Figure 18C:
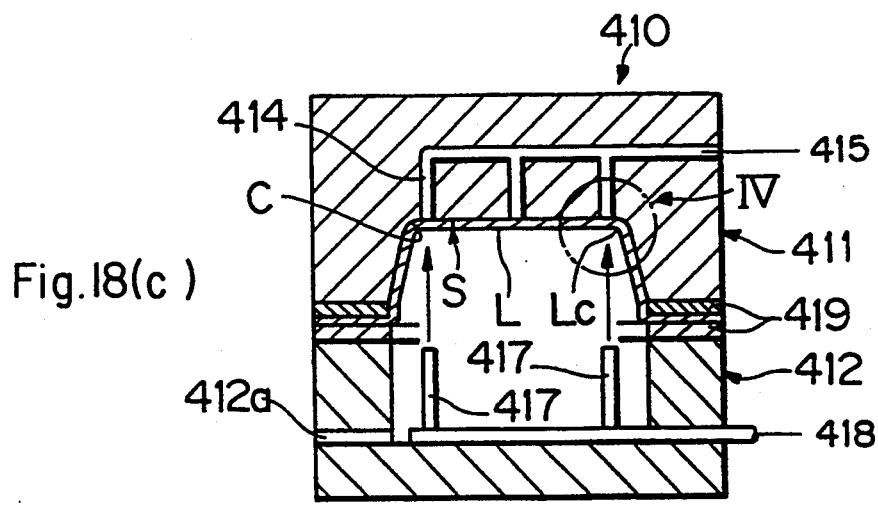

(iii) As shown in FIG. 18(c), by operating vacuum-source 415, the air existing in concavity 413 of mold 411 was evacuated through all the absorbing holes 414, and the laminated sheet L was fixed with pressure to the molding face due to a pressure difference between both the faces.

Also, by operating cool air-supplying source 418 cool air of normal temperature was blown out from all the nozzle 417 and this air was applied to a region Lc which corresponded to the valley-shaped corner part of the laminated sheet L.

As clearly shown in FIG. 19, when the laminated sheet L is fixed with pressure, because the downward flexible film 472 is somewhat apart from the valley-shaped corner part C, the synthetic resin solution (whose viscosity has been lowered) flows into the valley-shaped corner part C and, as a result, the volume of the synthetic resin solution in the valley-shaped corner part C increases. In the present example, the thickness $t_1$ of the region Lc which corresponds to the valley-shaped part of the laminated sheet L reached about 5-7 mm and that $t_2$ of other parts was 3-4 mm.

Under these circumstances, since thermal curing treatment by heat possessed by mold 411 is carried out on the part of molding sheet 406, the temperature of the region Lc which corresponds to the valley-shaped corner part becomes high, but this temperature-rise was depressed to about 190° C. by the cool air. In this case the melting temperature of above and lower flexible films 471 and 472 made of vinylon is about 200° C. and, therefore, melting of films 471 and 472 were avoided.

The main body 402 of the moldings 401 is shaped as follows:

(iv) Mold 411 went up and pressure box 412 went down, then molding 401 was removed from the mold. The above flexible film 471 was peeled off from the fiber-reinforced resin layer 404, and then the lower flexible film 472 was peeled off from the inner face resin layer 405, whereby molding 401 was obtained.

When molding sheet 406 is thermally cured without using cool air, the temperature of region Lc which corresponds to the valley-shaped corner rises to about 210° C. and, as a result, the above and lower flexible films 471 and 472 made of vinylon melted, resulting in bad shaping due to air invasion etc.

The vinylon constituting the above and lower flexible films 471 and 472 is a synthetic resin in a polyvinyl alcohol series and is hydrophilic and, therefore, as shown in FIG. 20, when the laminated sheet L is attached with pressure to the molding face S and an approximately whole region of lower flexible film 472 is sprayed with cool water from the nozzle 421 by operating the cool water-supplying source 420, a recovery force of the lower flexible 472 is relaxed.

Figure 21:
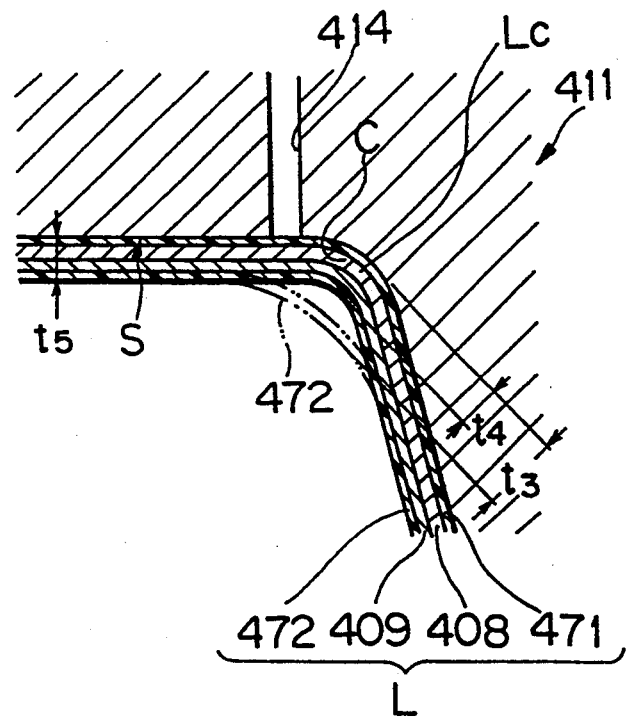
FIG. 21 is an enlarged view of the VI part in FIG. 20.

As clearly shown in FIG. 21, the lower flexible film 472 is accompanied with the valley-shaped corner part C via. the not-cured base material layer 408 and synthetic resin layer 409 and, as a result, not only a cooling effect similar to the above is obtained, but also thickness of the region corresponding to the valley-shaped corner part is reduced.

Thus, not only bad shaping of the molding 401 is avoided, but also uniformity of thickness is attained.

In a case where spraying of cool water is not carried out, as shown with a two-dotted chain line in FIG. 21, the thickness $t_3$ of the region Lc corresponding to the valley-shaped corner part reaches about 5–7 mm. In contrast, when spraying of cool water is carried out under a condition of 5 to 40 g/300 cm$^2$, it was confirmed that the thickness $t_4$ of the region Lc corresponding to the valley-shaped corner part became to 4–5 mm, which approached the thickness of other parts, $t_5$=3–4 mm.

In FIG. 20 the 422 is a pressure source and cooperates with the vacuum source 415 when the laminated sheet L is stuck with pressure. The 423 and 424 are, respectively, a hole for supplying pressurized air and a water-evacuating hole.

Figure 22:
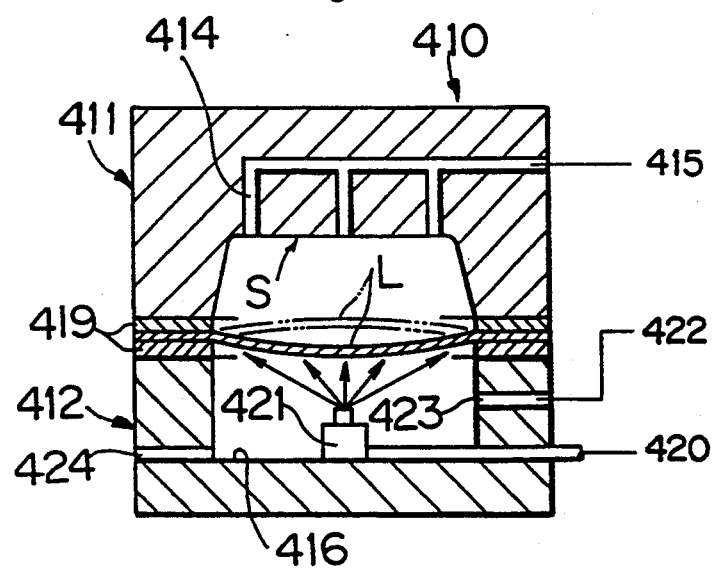
FIG. 22 is a cross-sectional view of a molding condition showing another example.
Figure 23:
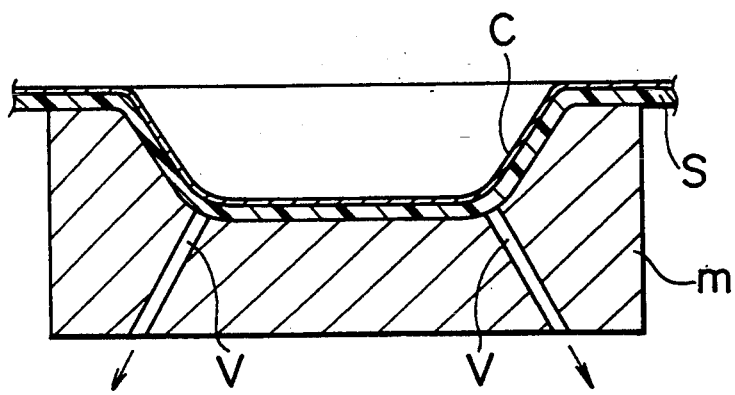
FIG. 23 is a cross-sectional view of a previous example.

The solid line and two-dotted chain line in FIG. 22 show, respectively, a case where water is sprayed over an approximately whole region of the laminated sheet L before the process of the sheet L for sticking with pressure is initiated, and a case where water is sprayed over an approximately whole region of the laminated sheet L during the process of the sheet L for sticking with pressure.

The recovery force of lower flexible film 472 can be relaxed even if the water spraying is carried out before the process of the laminated sheet L for sticking with pressure to the mold face S.

In the forementioned example, when the lower flexible film 472 is lyophilic, a solvent, for example, a solvent in a glycol series is used instead of water. Also, when the lower flexible film is hydrophilic as well as lyophilic, at least one of the water and solvent is used.

Besides, in the example in FIG. 18, at least one of the water and solvent may be contained in the cool air.

What is claimed are:

1. A method for molding a fiber-reinforced resin, comprising:
   (i) placing a fiber reinforced molding resin sheet onto at least a portion of a molding surface of a molding apparatus, said molding sheet being covered with a flexible covering film at least on a side face layer which is not in contact with said molding surface, said flexible covering film being exposed to a second means for promoting curing;
   (ii) molding said sheet into a desired shape, thereby producing a shaped article;
   (iii) thermally curing said shaped article by transfer of heat from said molding surface to said shaped article by contact therebetween, thereby producing a molding article,
   wherein curing is also promoted by said second means for promoting curing other than by said transfer of heat from said molding surface,
   said second means being directly applied to said flexible covering film, such that said side face layer of said molding sheet is only partially cured at least until said side face layer being covered by said flexible covering film hardens.

2. The method of claim 1, wherein said second means for promoting curing comprises a UV curing agent which is added to a resin material of the molding sheet, and ultraviolet rays are irradiated upon said side face layer being covered by said flexible covering film.

3. The method of claim 2, wherein irradiation of said ultraviolet rays upon said side face layer is stopped just before complete curing of said side face layer occurs.

4. The method of claim 1, wherein said second means for promoting curing comprises electron rays which are irradiated upon said side face layer being covered by said flexible covering film.

5. The method of claim 1, wherein said second means for promoting curing comprises an additional direct heating, which differs from heating of the entire molding sheet due to heat-transfer from the mold face, and is carried out on said side face layer being covered by said flexible covering film after it has been shaped along the mold face.

6. The method of claim 5, wherein said additional direct heating comprises heating by blowing heated air toward said side face molding sheet.

7. A method for molding a fiber-reinforced resin, comprising:
   (i) placing a fiber reinforced molding resin sheet onto at least a portion of a molding surface of a molding apparatus, said molding sheet being covered with a flexible covering film at least on a side face layer which is not in contact with said molding surface;
   (ii) molding said sheet into a desired shape, thereby producing a shaped article;
   (iii) thermally curing said shaped article by transfer of heat from said molding surface to said shaped article by contact therebetween, thereby producing a molding article, wherein curing is also promoted by a second means for promoting curing other than by said transfer of heat from said molding surface, said second means being applied to said side face layer of said molding sheet, such that said molding sheet is only partially cured, said side face layer being covered by said flexible covering film prior to thermal curing in order to prevent any problem accompanied with accidental breakage of said flexible film at least until said side face layer being covered by said flexible covering film hardens, wherein said second means for promoting curing comprises an additional direct heating, which differs from heating of the entire molding sheet due to heat-transfer from the mold face, and is carried out on said side face layer being covered by said flexible covering film after it has been shaped along the mold face, wherein said additional direct heating comprises heating by infrared rays upon said side face of the sheet for molding.

8. A method of for molding a fiber-reinforced resin, comprising:
(i) placing a fiber reinforced molding resin sheet onto at least a portion of a molding surface of a molding apparatus, said molding sheet being covered with a flexible covering film at least on a side face layer which is not in contact with said molding surface;
(ii) molding said sheet into a desired shape, thereby producing a shaped article;
(iii) thermally curing said shaped article by transfer of heat from said molding surface to said shaped article by contact therebetween, thereby producing a molding article, wherein curing is also promoted by a second means for promoting curing other than by said transfer of heat from said molding surface, said second means being applied to said side face layer of said molding sheet, such that said molding sheet is only partially cured, said side face layer being covered by said flexible covering film prior to thermal curing in order to prevent any problem accompanied with accidental breakage of said flexible film at least until said side face layer being covered by said flexible covering film hardens, wherein said second means for promoting curing is selected from the group consisting of ultraviolet radiation or electron beam radiation, and wherein said second means for promoting curing is applied after said fiber-reinforced molding sheet is molded into a desired shape.

\* \* \* \* \*